May 9, 1967 W. B. CRANE ETAL 3,318,204
MACHINE FOR AND METHOD OF FORMING PRODUCE TRAYS
Filed March 9, 1964 12 Sheets-Sheet 1
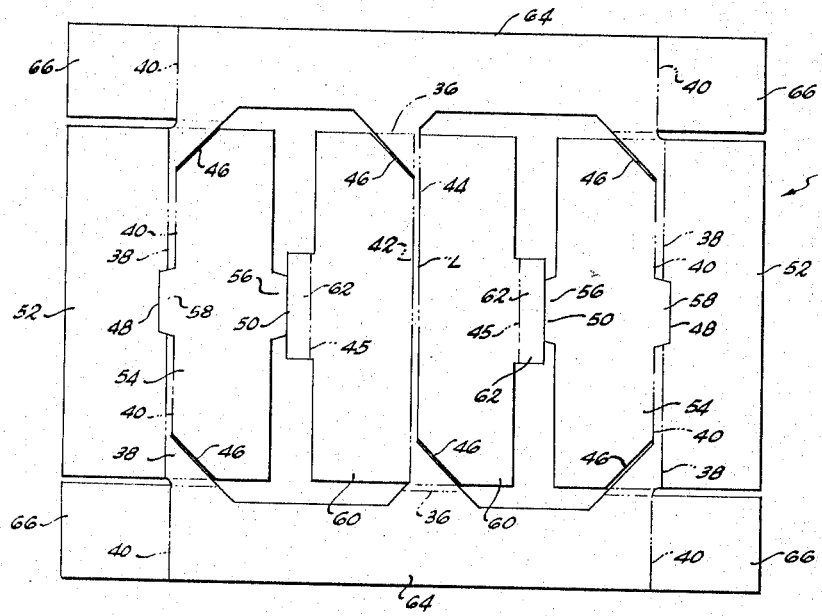
Fig.1
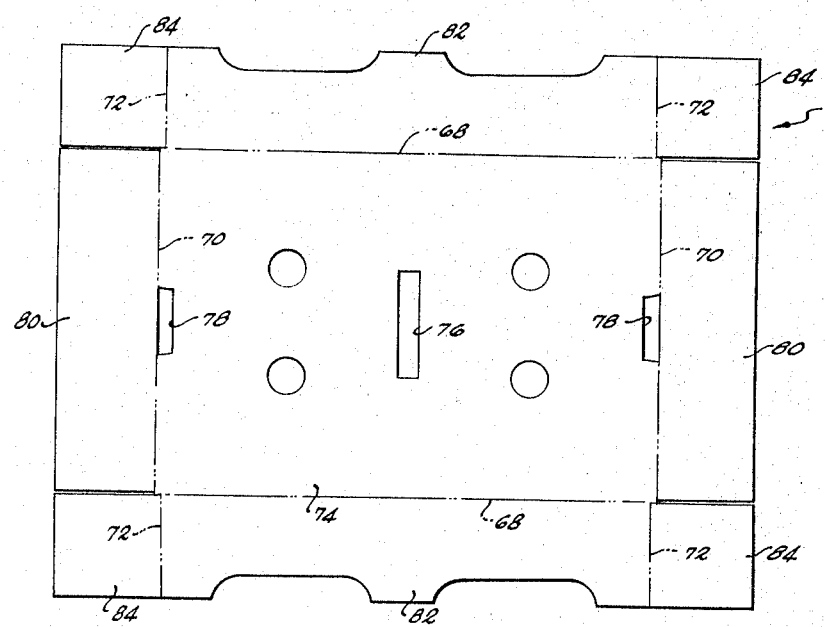
Fig.2
INVENTORS
WALTON B. CRANE
JOHN C. PETERSON
BY Forrest J. Lilly
ATTORNEY

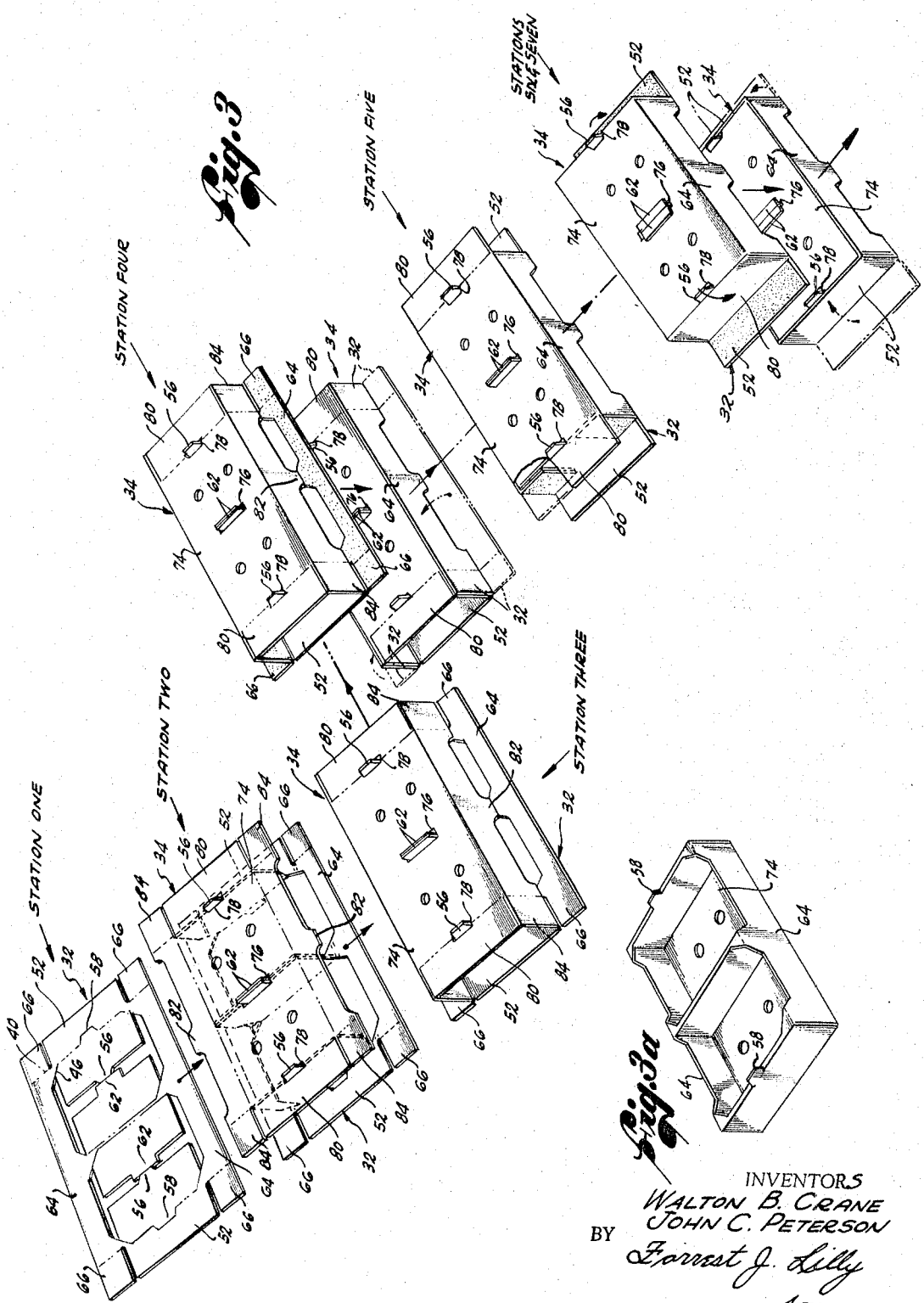

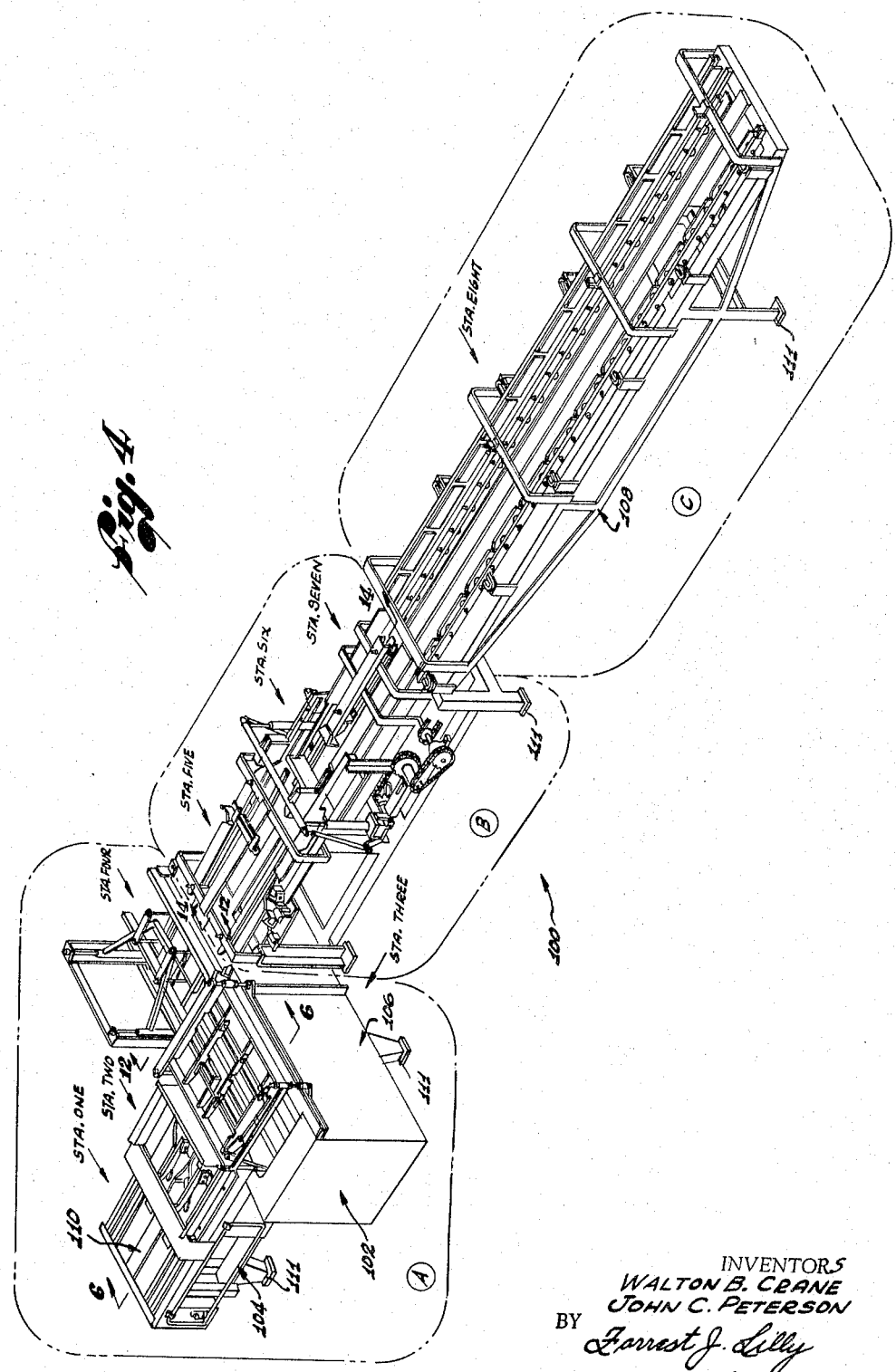

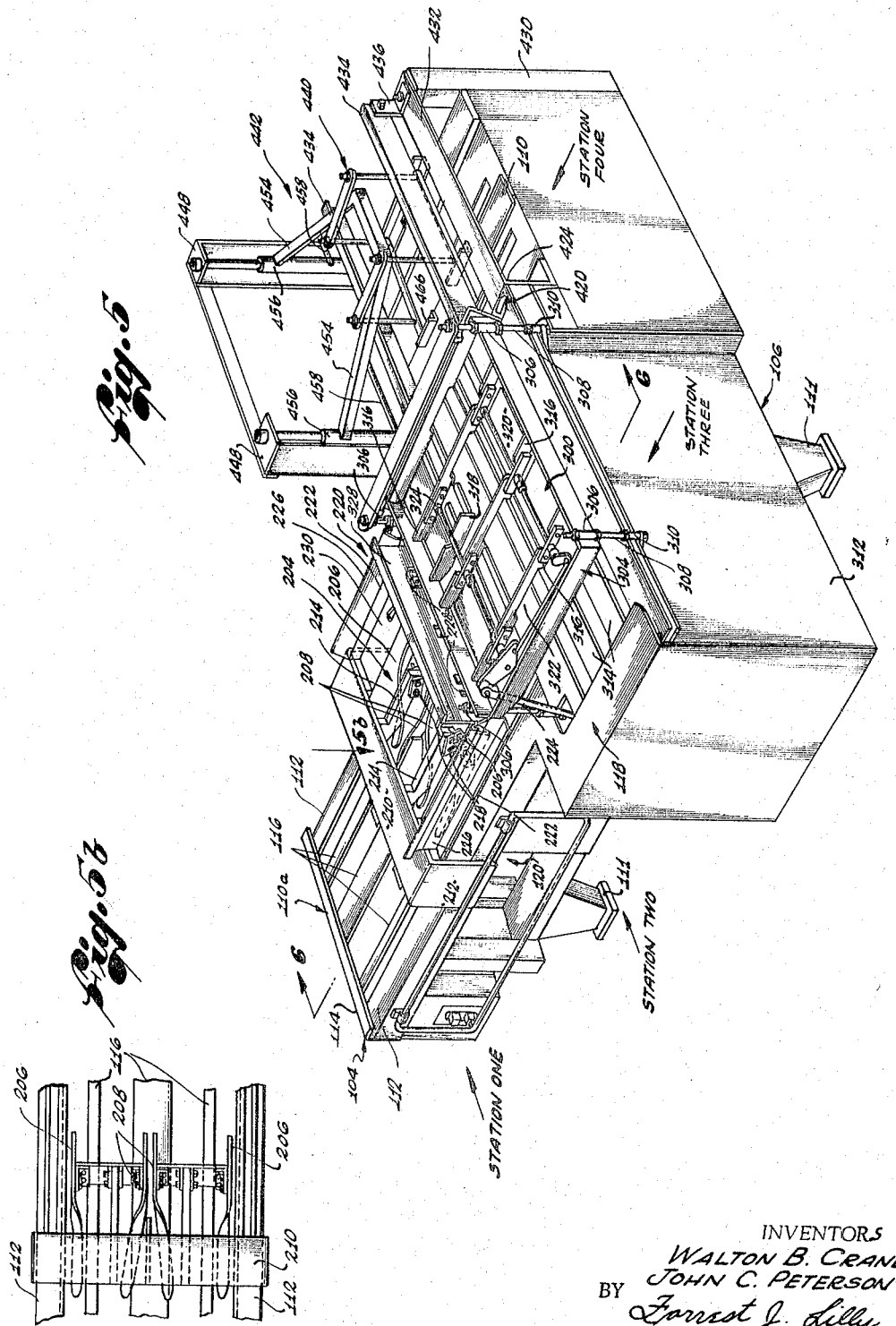

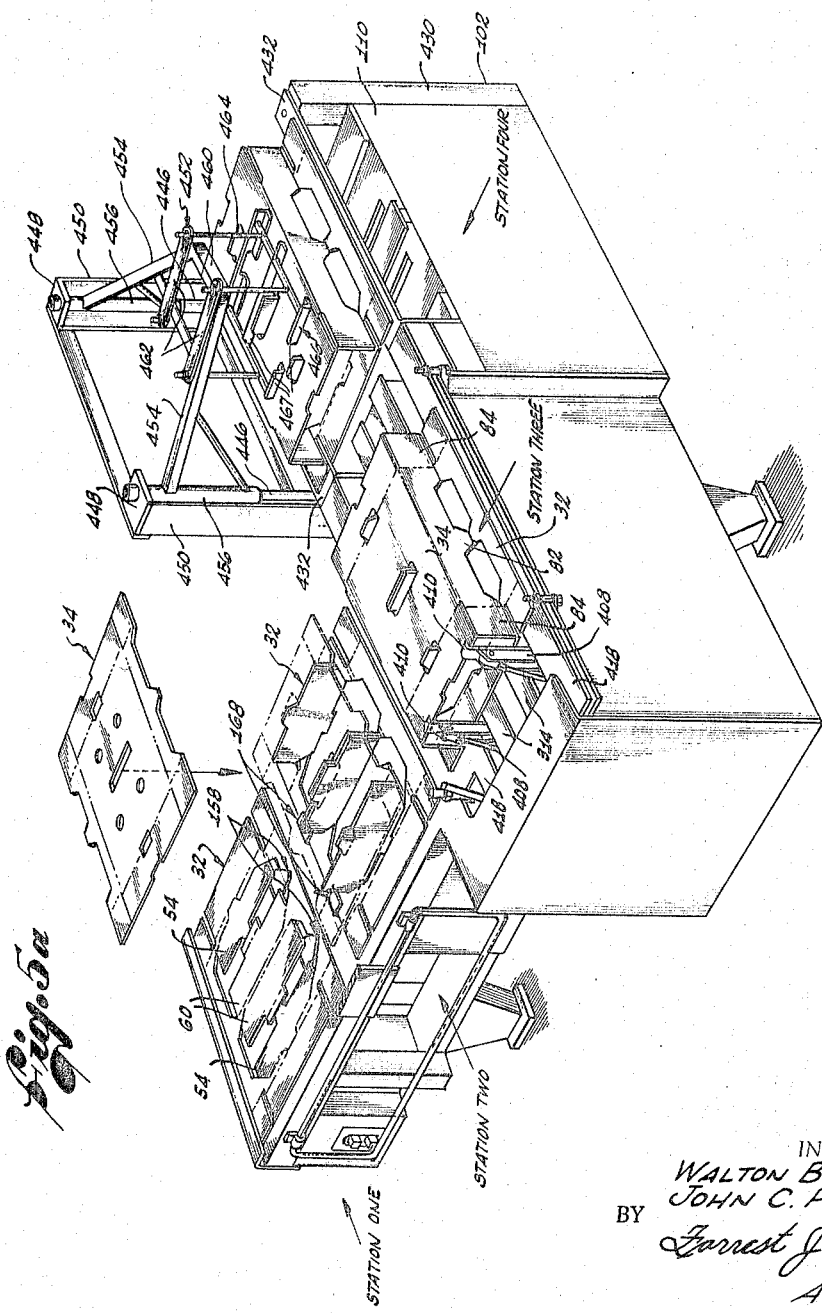

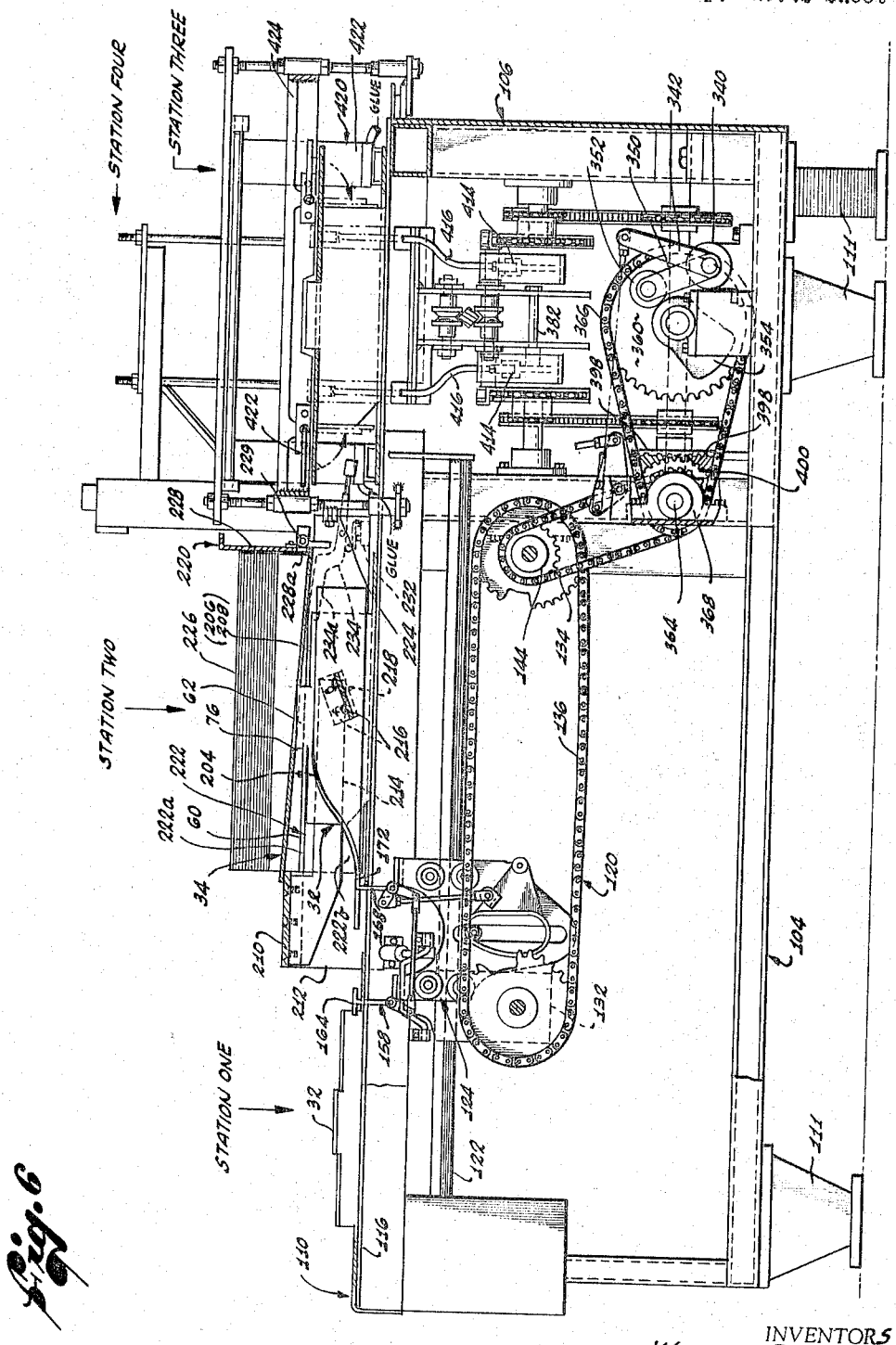

INVENTORS
WALTON C. CRANE
JOHN C. PETERSON
BY Farrest J. Lilly
ATTORNEY

May 9, 1967 W. B. CRANE ETAL 3,318,204
MACHINE FOR AND METHOD OF FORMING PRODUCE TRAYS
Filed March 9, 1964 12 Sheets-Sheet 8
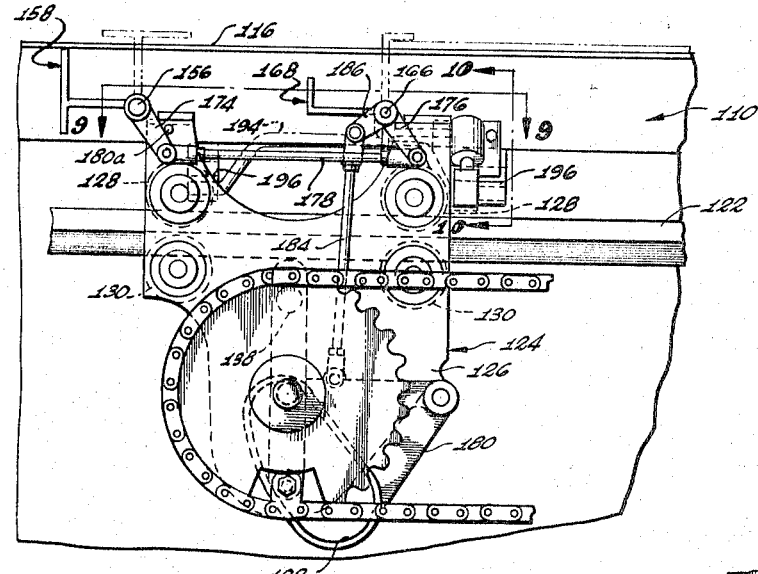
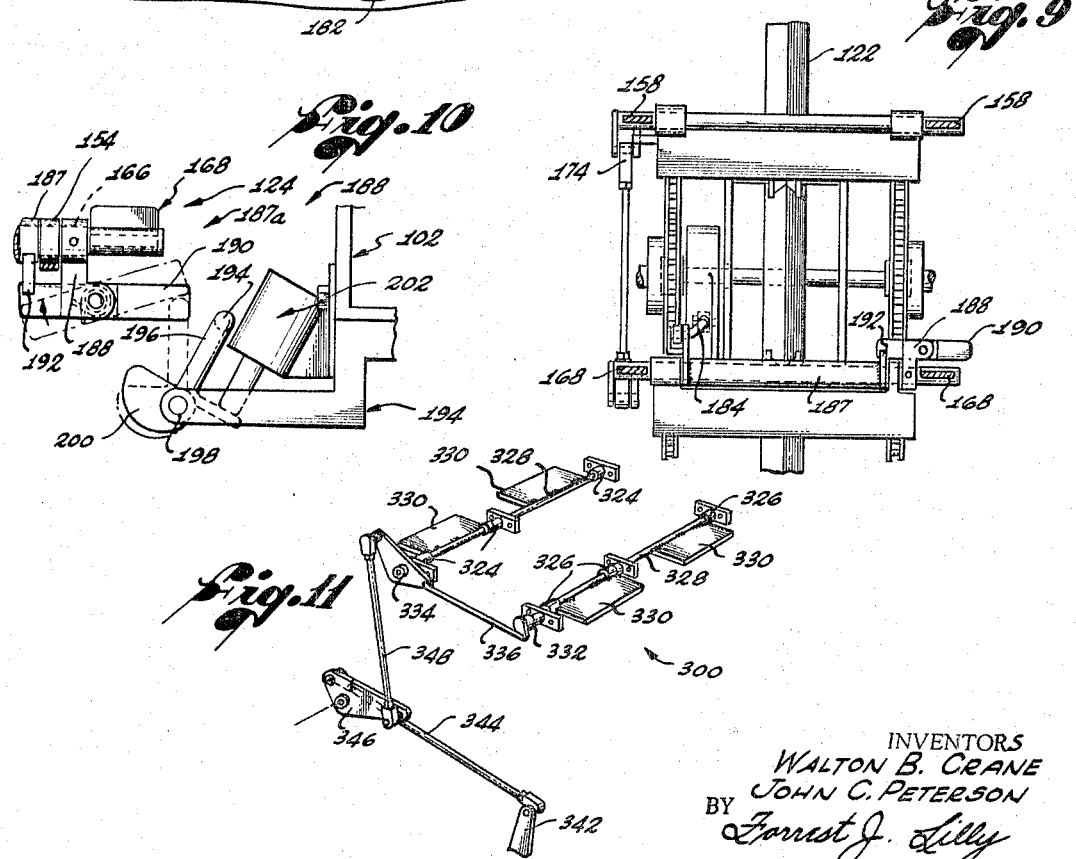
INVENTORS
WALTON B. CRANE
JOHN C. PETERSON
BY
Forrest J. Lilly
ATTORNEY

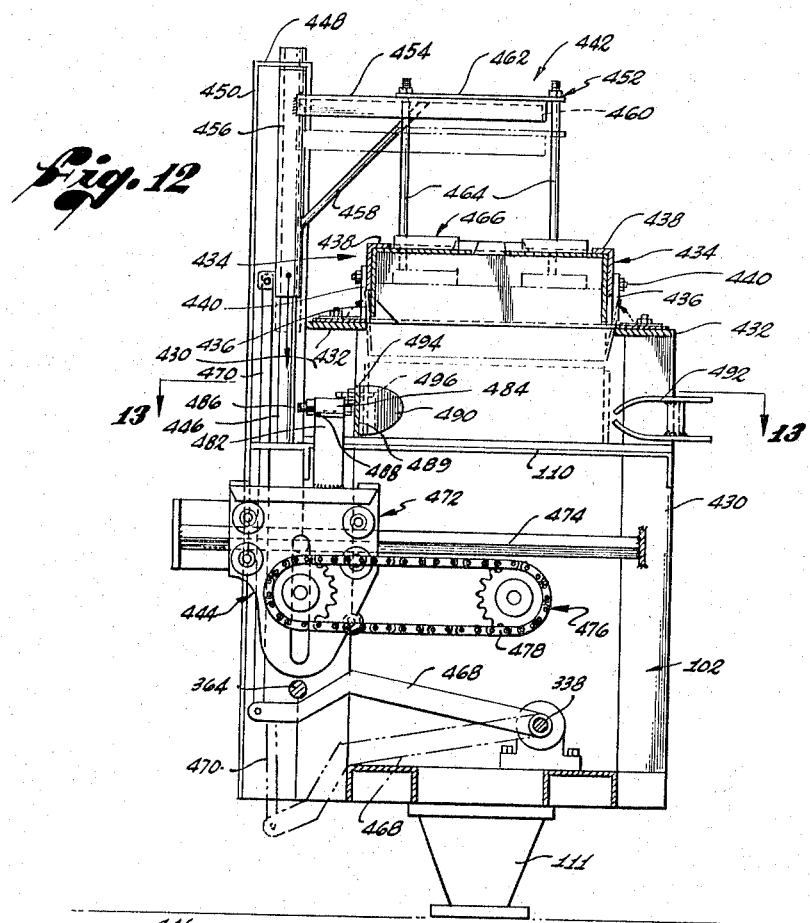

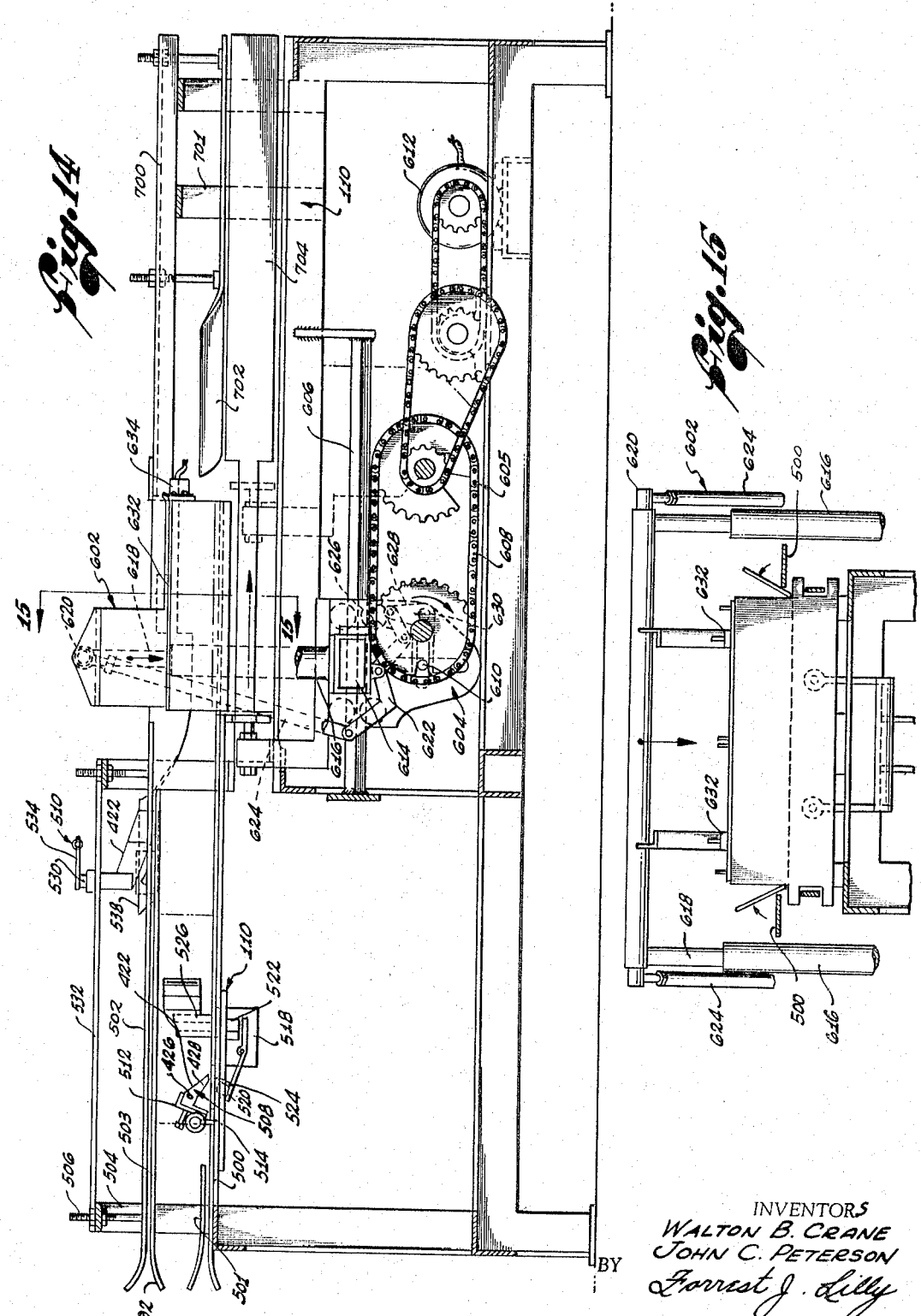

May 9, 1967 W. B. CRANE ETAL 3,318,204
MACHINE FOR AND METHOD OF FORMING PRODUCE TRAYS
Filed March 9, 1964 12 Sheets-Sheet 11
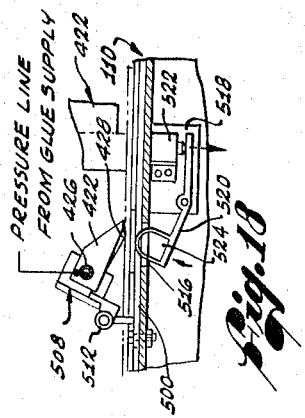
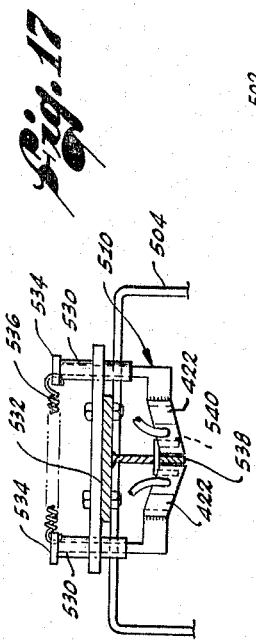
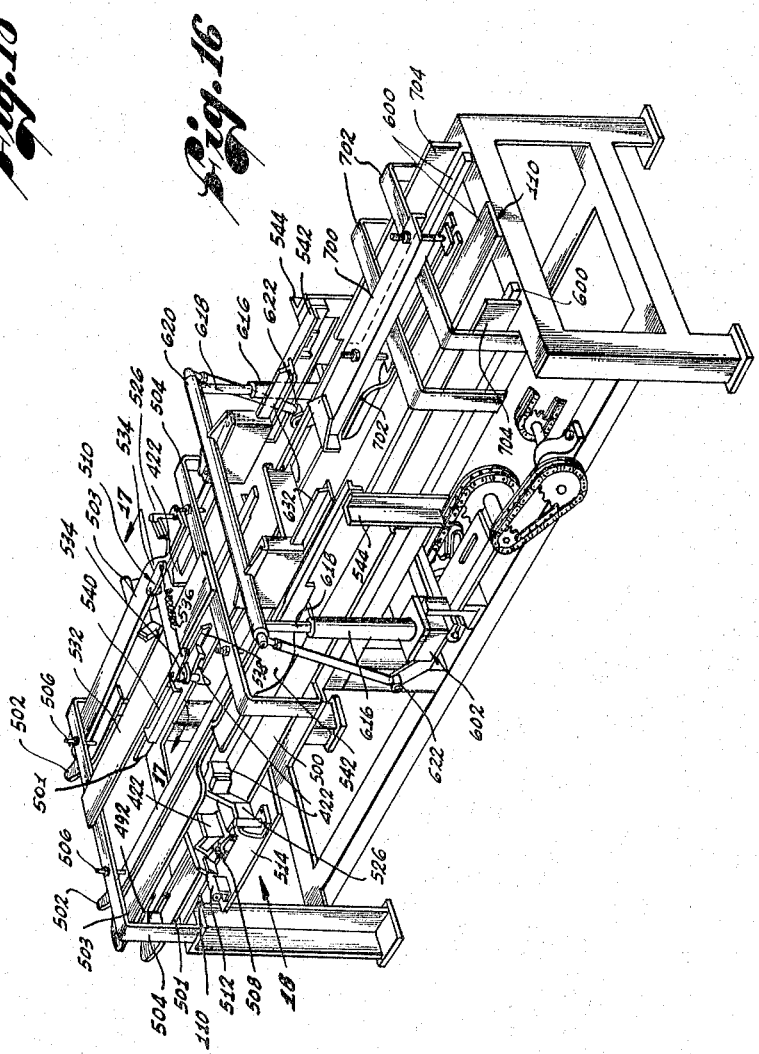
INVENTORS
WALTON B. CRANE
JOHN C. PETERSON
BY
Forrest J. Lilly
ATTORNEY May 9, 1967 W. B. CRANE ETAL 3,318,204
MACHINE FOR AND METHOD OF FORMING PRODUCE TRAYS
Filed March 9, 1964 12 Sheets-Sheet 12
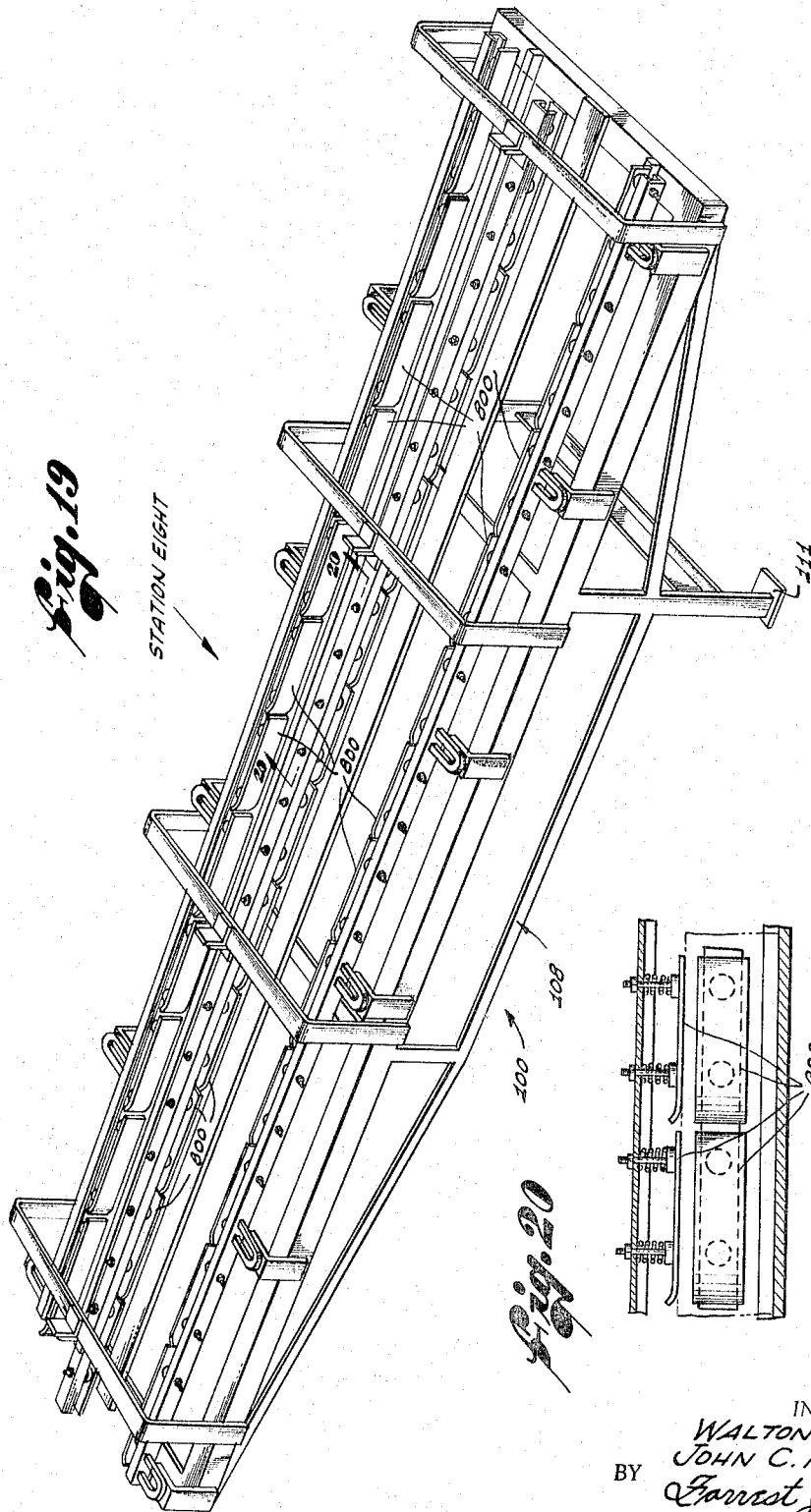
INVENTORS
WALTON B. CRANE
JOHN C. PETERSON
BY Farrest J. Lilly
ATTORNEY

United States Patent Office 3,318,204
Patented May 9, 1967

3,318,204
MACHINE FOR AND METHOD OF FORMING PRODUCE TRAYS
Walton B. Crane, Arcadia, and John C. Peterson, Watsonville, Calif., assignors to Allied Plastics Company, Los Angeles, Calif., a corporation of California
Filed Mar. 9, 1964, Ser. No. 350,511
29 Claims. (Cl. 93—37)

This invention relates generally to the art of fabricating paperboard containers for handling and shipping fruit, vegetables and other agricultural products. The invention relates more particularly to a machine for and method of erecting or folding wall forming members of performed paperboard blanks and adhesively joining certain of the members to form a completed open-topped produce container, or tray as it is commonly called.

The machine of this invention is designed for use in fabricating a paperboard produce tray of the type disclosed in copending application Ser. No. 235,615 filed Nov. 6, 1962, and entitled, Shipping Container, now Patent No. 3,194,472. This produce tray is made from two preformed paperboard blanks, hereinafter referred to as a top forming blank and a bottom forming blank, respectively. The blanks are slit and creased in such manner as to provide each blank with various wall forming panels, connecting flaps, locking tabs, and locking slots. In the course of fabricating the tray, the wall forming panels and connecting flaps of the blanks are erected or folded, certain of the panels and flaps are adhesively bonded to one another, and other panels are locked together by engagement of locking tabs thereon in locking slots, all in such manner as to form a finished open-topped produce tray having strongly reinforced corners, multiple thickness end walls, side walls, and a medial cross partition, all permanently joined to the bottom wall of the tray to reinforce the latter wall against bowing or sagging.

It is a general object of this invention to provide a machine for forming produce trays of the character described.

A more specific object of the invention is to provide a forming machine which operates on performed paperboard blanks of the character described to erect the wall forming panels of the blanks, adhesively join certain of the folded panels, and lock together other panels by interengagement of locking tabs and slots thereon, all in such manner as to form a finished open-topped produce tray.

A further object of the invention is to provide a forming machine of the character described wherein top and bottom forming blanks are delivered in flat condition to one end of the machine and are thereafter conveyed in continuous fashion through a series of successive forming stations spaced along the machine at which the blanks are automatically erected, mated, and adhesively joined to finally emerge from the machine as completed produce trays.

Other objects, advantages, and features of the invention will present themselves as the description proceeds.

Briefly, the invention provides a produce tray forming machine equipped with a long main frame having an infeed end, an outfeed end, and a series of intervening forming stations spaced along the frame. Mounted on this frame are conveyor means for feeding top and bottom forming blanks through these forming stations to the outfeed end of the machine. The top forming blanks are delivered in flat condition to one station and the bottom forming blanks are delivered in flat condition to a following station. During movement of the top forming blank to the latter station, the blank is partially erected. As the partially erected top forming blank passes through the latter station, it mates with and carries along the bottom forming blank to form a set of mating blanks which are then conveyed as a unit through the remainder of the machine.

Located at subsequent forming stations, and between certain of the stations, are folding means which fold or erect particular wall forming panels and/or corner connecting flaps of each blank set into tray forming positions. Certain of the stations contain, or are preceded by, glue applicator means which coat particular flaps and/or wall forming panels of each blank set with glue, in such manner that the coated wall forming panels and flaps are folded into adhesive bonding relation to other wall forming panels and/or flaps at the respective forming station or the following station.

During operation of the machine, each top forming blank is delivered to the infeed end of the machine and each bottom forming blank is delivered to a following forming station of the machine. The blanks are then fed in continuous fashion through the machine by the conveyor means. As each top forming blank advances through said following station, it mates with a bottom forming blank at the latter station, thereby creating a set of mating blanks which advances as a unit through the remainder of the machine. As each set of mating blanks advances through the machine, the wall forming panels and corner connecting flaps of the blanks are successively coated with glue and/or folded or erected into tray forming relation, all in such manner that each blank set emerges from the outfeed end of the frame as a completed produce tray of the type disclosed in the aforementioned copending application Ser. No. 235,615.

A presently illustrative embodiment of the present produce tray forming machine will now be described by reference to the attached drawings, wherein:

FIG. 1 is a plan view of a top forming blank for a produce tray of the type which the present machine is designed to form;

FIG. 2 is a plan view of the bottom forming blank for the produce tray;

FIG. 3 is a flow diagram illustrating the successive forming steps performed by the present machine in forming a produce tray from the blanks illustrated in FIGS. 1 and 2;

FIG. 3a is a perspective view of the completed produce tray;

FIG. 4 is a perspective view of the entire forming machine of the invention;

FIG. 5 is an enlarged perspective view of forming Stations One through Four of the machine;

FIG. 5a is a view similar to FIG. 5 with parts of the machine omitted and showing top and bottom forming blanks in forming positions at Stations One through Four of the machine;

FIG. 5b is a plan view of Station Two of the machine;

FIG. 6 is an enlarged vertical section through forming Stations One through Three of the machine, and taken substantially along line 6—6 in FIG. 4;

FIG. 8 is an enlarged detail of a portion of an infeed conveyor means embodied in the conveyor mechanism of FIG. 7;

FIG. 9 is a section taken along line 9—9 in FIG. 8;

FIG. 10 is an enlarged section taken along line 10—10 in FIG. 8;

FIG. 11 is an enlarged perspective view of certain forming means at Station Three of the machin FIG. 12 is an enlarged vertical section through forming Station Four of the machine, and taken substantially along line 12—12 in FIG. 4;

FIG. 13 is a section taken along line 13—13 in FIG. 12 after movement of certain parts in FIG. 12 to subsequent operative positions thereof;

FIG. 14 is an enlarged vertical section through forming Stations Five through Seven of the machine, and taken substantially along line 14—14 in FIG. 4;

FIG. 15 is a section taken along line 15—15 in FIG. 14;

FIG. 16 is an enlarged perspective view of forming Stations Five through Seven of the machine;

FIG. 17 is an enlarged section taken along line 17—17 in FIG. 16;

FIG. 18 is a view looking in the direction of arrow 18 in FIG. 16;

FIG. 19 is an enlarged perspective view of Station Eight of the machine; and

FIG. 20 is an enlarged section taken along line 20—20 in FIG. 19.

Figure 7:
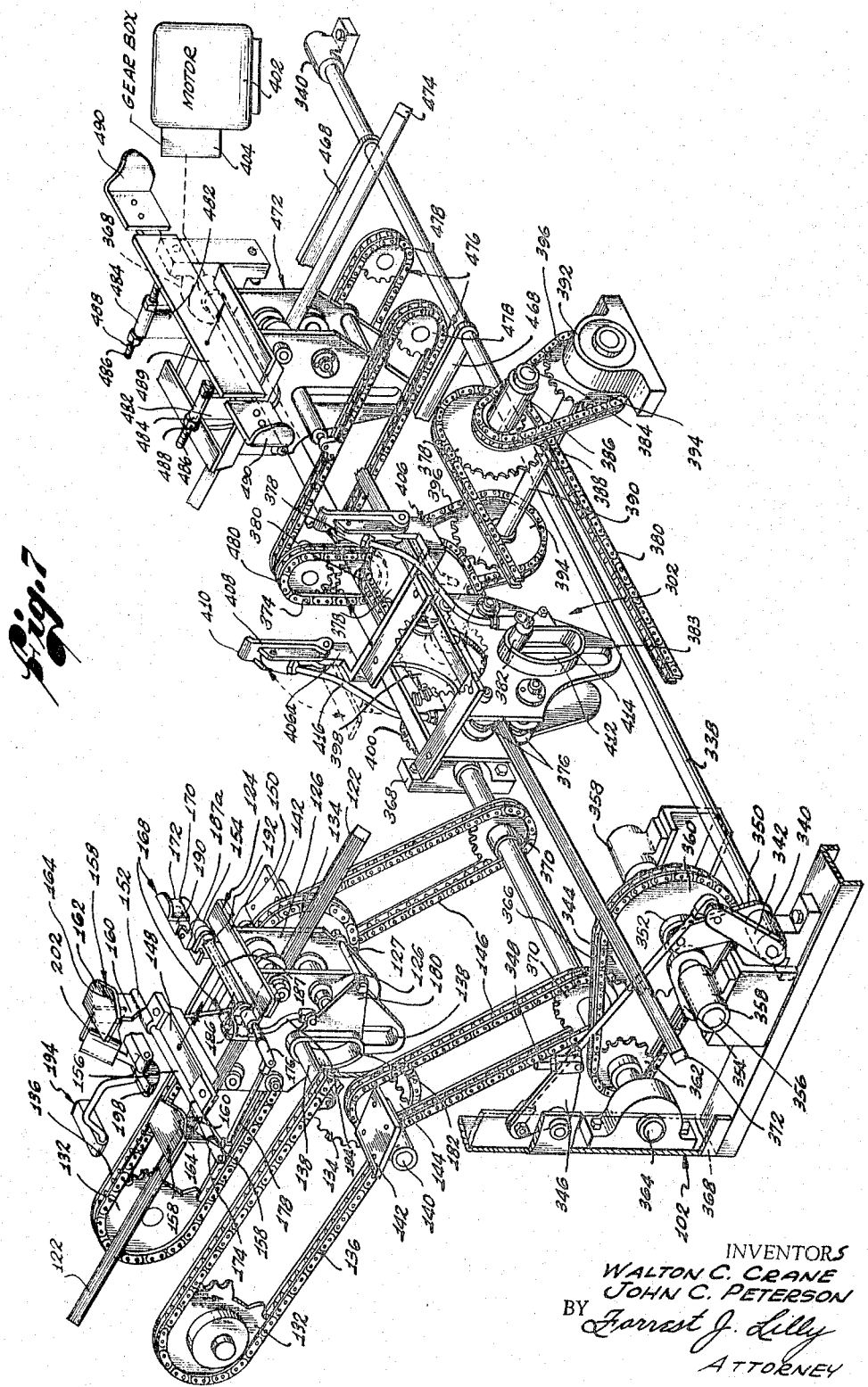
FIG. 7 is an enlarged perspective view of a conveyor mechanism for feeding top and bottom forming blanks through forming Stations One through Four of the machine.

Reference is made first to FIGS. 1 and 2 of these drawings illustrating a set of mating top and bottom forming blanks of the type on which the present forming machine operates and to FIG. 3 illustrating the successive steps performed by the machine in forming a produce tray of the type disclosed in the aforementioned copending application Ser. No. 235,615. A completed tray of this type is shown at 30 in FIG. 3a. Tray 30 is fabricated from two preformed blanks, to wit, a top forming blank 32 and a bottom forming blank 34. The top forming blank 32 is creased along longitudinal hinge or fold lines 36 and along transverse hinge or fold lines 38, 40, 42, 44 and 45, slit along lines 46, 48 and 50, and is otherwise notched and slotted, as shown, to provide the blank with the following elements; a pair of outer end wall forming panels 52, a pair of inner end wall forming panels 54 having locking tab formations 56 and 58 along opposite edges thereof, a pair of cross wall or partition forming panels 60 having locking tab formations in the form of glue flaps 62 along one edge thereof, a pair of side wall forming panels 64, and four corner connecting flaps 66.

The bottom forming blank 34 is creased along longitudinal hinge or fold lines 68 and transverse hinge or fold lines 70 and 72 and is otherwise slotted and notched, as shown, to define on the bottom forming blank the following elements: a bottom wall forming panel 74 having locking slots 76 and 78 therein, a pair of end wall forming panels 80, a pair of side wall forming panels 82, and four corner connecting flaps 84. The side edges of the side wall forming panels 82 are contoured, as shown, for reasons which will appear presently.

During operation of the present produce tray forming machine, the top forming blank 32 and the bottom forming blank 34 are advanced through a series of successive forming stations of the machine wherein the several wall forming panels and corner connecting flaps of the blanks are erected or folded and adhesively joined in the manner diagrammatically illustrated in FIG. 3 and hereinafter described in greater detail. The top forming blank 32 is delivered in flat condition to the machine at Station One with its underside uppermost. The blank is then advanced laterally from Station One, through Station Two, to Station Three. During advancing of the blank 32 from Station One to Station Two, the inner end wall forming panels 54 and the cross partition forming panels 60 are folded upwardly to positions in which these panels are approximately normal to the plane of the blank.

As the partially erected or folded top forming blank 32 advances through Station Two, it receives an inverted bottom forming blank 34 in such manner that the locking tabs 56 and glue flaps 62 on the top forming blank 32 engage in the locking slots 76 and 78 in the bottom forming blank. The mating blanks then advance as a unitary set to Station Three. At Station Three, the side wall forming panels 82 and corner connecting flaps 84 of the bottom forming blank 34 are folded downwardly toward the underlying top forming blank 32, after which the set of mating blanks is advanced endwise to Station Four. During this transfer of the blanks to Station Four, glue is applied to the upwardly facing surfaces of the side wall forming panels 64 and the corner connecting flaps 66 of the top forming blank 32. At Station Four, the side wall forming panels 64 and corner connecting flaps 66 of the top forming blank 32 are folded upwardly into contact with the downwardly folded side wall forming panels 82 and corner connecting flaps 84 of the bottom forming blank 34, thereby to adhesively join the abutting panels and corner flaps. The set of mating blanks is then advanced transversely through the remaining stations of the machine.

During transfer of the blanks from Station Four to Station Five, the adhesively joined corner connecting flaps 66 and 84 of the blanks are folded inwardly toward one another so that the corner flaps at each end of the blanks are approximately coplanarly disposed. As the blanks pass through Station Five, glue is applied to the upper surfaces of the outer end wall forming panels 52, to the outwardly facing surfaces of the now inwardly folded corner connecting flaps 66, and to the outer surfaces of the glue flaps 62 of the top forming blank 32. At Station Six of the machine, the end wall forming panels 80 of the bottom forming blank 34 are folded downwardly against the outwardly facing, adhesively coated surfaces of the inturned corner connecting flaps 66 of the top forming blank 32 to adhesively bond these flaps and panels together.

During passage of the set of mating blanks through Station Seven toward the final Station Eight of the machine, the adhesively coated glue flaps 62 of the top forming blank 32 are folded downwardly against the upper surface of the bottom forming panel 74 of the bottom forming blank 34 and the adhesively coated outer end wall forming panels 52 of the top forming blank 32 are folded upwardly against the now downwardly folded end wall forming panels 80 of the bottom forming blank 34. As the set of blanks advances through the final Station Eight of the machine, the blanks are maintained under pressure in the endwise direction to effect firm adhesive bonding of the end wall forming panels and corner connecting flaps of the top and bottom forming blanks. The blanks then emerge from the machine as a completed produce tray 30.

The produce tray forming machine 100 of the invention for performing the tray forming operations discussed above will now be described. In FIG. 4, the machine is illustrated in its entirety and the several stations of the machine, referred to above, are indicated. In the ensuing detailed description of the machine, the latter will be treated in the chronological order of these stations. Considering the machine generally at first, however, the latter has an elongate, main supporting frame 102 including a first leg 104 containing Stations One and Two, a second leg 106 extending at right angles to the first leg and containing Stations Three and Four, and a third leg 108 extending at right angles to the second leg 106 and containing Stations Five through Eight. In actual practice, this main supporting frame of the machine may be composed of several sections bolted or otherwise rigidly joined to form an integral frame structure. Frame 102 has an upper bed, generally designated by the numeral 110, which slidably supports the blanks for movement along the machine frame and through the successive forming stations. Frame bed 110 is located at a convenient height above the floor and, to this end, is supported at intervals on legs 111. The elevation of the frame bed 110 drops at Station Four and again at Station Six for reasons to be explained later.

During operation of the machine, the top forming blanks 32 are delivered in flat condition to Station One and are then conveyor fed, in a transverse direction, that is, along a direction line parallel to their hinge lines 38 through 42, to Station Two. At Station Two, each top forming blank receives a mating bottom forming blank 34. The sets of mating blanks are fed laterally to Station Three and then endwise from Station Three to Station Four. At Station Four, each blank set is depressed to the lower elevation of the frame bed 110 at the latter station and is then again fed laterally from Station Four through Station Five to Station Six. At Station Six, each set of mating blanks is again depressed to the lower level of the frame bed 110 at this station. The blanks then continue to be fed laterally through Stations Seven and Eight. The wall forming panels and corner connecting flaps of the blanks are successively folded or erected and adhesively bonded at these different stations, as described above, whereby each set of mating blanks finally emerges as a completed produce tray from the right-hand outfeed end of the machine in FIG. 4.

With the foregoing general description of the present produce tray forming machine in mind, we proceed now to a detailed description of the several forming stations of the machine.

Forming Stations One and Two (FIGS. 4–10)

The portion of the frame bed 110 on the frame leg 104 comprises side frame members 112 and an end frame member 114 which are welded or otherwise rigidly joined to form an open, generally rectangular frame structure. Within this rectangular frame structure are laterally spaced supporting rails 116 which extend lengthwise of the frame leg 104 and are rigidly secured at one end to the cross frame member 114. The other ends of frame members 112 and rails 116 are secured to the frame structure 118 of the center frame leg 106. Mounted on the frame leg 104, below the supporting rails 116, is an infeed conveyor 120 which feeds the top forming blanks 32 delivered to the machine from Station One, through Station Two, to Station Three. Referring particularly to FIGS. 6–10, the infeed conveyor 120 will be seen to comprise a rectangular supporting track 122 which is rigidly fixed at its ends to the bed 110 of the frame leg 104. Track 122 extends lengthwise of the frame leg 104 about midway between the sides thereof. The side faces of the supporting track are disposed at 45° angles to the vertical, as may be best observed in FIG. 7.

Movably supported on the track 122 is an infeed carriage 124. As shown best in FIG. 7, carriage 124 is composed of two side plates 126 which straddle the supporting track 122 and are rigidly secured together by bolts 127. Disposed between and rotatably supported by the side plates 126 are a pair of upper rollers 128 which ride on the upper faces of the supporting track 122 and a pair of lower rollers 130 which ride on the under faces of the supporting track. Rollers 128 and 130 are formed with V-shaped peripheral grooves which complement the rectangular cross-section of the supporting track 122, whereby the infeed carriage 124 is capable of free movement lengthwise of the track but is restrained against rotation about the longitudinal axis of the track.

Rotatably supported on the bed 110 at the frame leg 104, at each side of the supporting track 122, are a pair of coplanar sprockets 132 and 134. Trained about each pair of sprockets is a sprocket chain 136. A drive bar 138 extends between and is secured at its ends to the sprocket chains 136. This drive bar extends through vertically elongated slots 138 in the side plates 126 of the infeed carriage 124. It is evident, therefore, that if the sprocket chains 136 are driven in unison, the infeed carriage 124 travels back and forth along its supporting track 122. Each sprocket 134 is keyed on a shaft 140 which is rotatably supported by a bearing 142 on the bed 110. Also keyed on each shaft 140 is a smaller sprocket 144 around which is trained a sprocket chain 146. Sprocket chains 146 are driven in unison, in a manner to be explained shortly, thereby to drive the sprocket chains 136 and the infeed carriage 124.

Bridging and rigidly joined to the upper edges of the infeed carriage side plates 126, adjacent the front and rear edges of these plates, are crossbars 148 and 150. A pair of coaxial bearing sleeves 152 are rigidly fixed to the ends of the crossbar 148. A second pair of bearing sleeves 154 are rigidly fixed to the ends of the crossbar 150. Journaled in the bearing sleeves 152 is a shaft 156. Rigidly fixed to the ends of this shaft, outboard of the bearing sleeves 152, are a pair of rear conveyor arms 158. Conveyor arms 158 comprise flat, plate-like members 160 disposed in a common plane parallel to shaft 156 and flanges 162 disposed in a common plane normal to the members 160. The forwardly projecting extremities of these flanges define blank engaging lips 164 on the conveyor arms.

Journaled in the forward bearing sleeves 154 is a shaft 166. Rigidly fixed to the ends of this shaft, outboard of the bearing sleeves 154, are a pair of forward conveyor arms 168. Conveyor arms 168 comprise flat, plate-like members 170 disposed in the common plane parallel to the shaft 166. The outer extremities of these members are bent forwardly to define blank engaging lips 172 disposed in a common plane normal to the members 170.

The conveyor arms 158 and 168 are rotatably mounted on the infeed carriage 124, as just described, to permit the arms to be extended into or retracted from the path of movement of the top forming blanks 32 along the frame leg 104. The reason for thus extending and retracting the arms will appear presently. The arms are extended and retracted by mechanism which will now be described.

Rigidly fixed to one of the rear pivot shaft 156 are a pair of depending radial arms 174. A similar pair of radial arms 176 are rigidly fixed to the corresponding end of the forward pivot shaft 166. These radial arms are oriented, as shown, so that when the rear and forward conveyor arms 158 and 168 are in their normal extended positions of FIG. 7, the radial arms 174 and 176 are parallel to one another and inclined in the forward direction of the infeed carriage 124. Pivotally connected at its ends to the lower ends of the radial arms 174 and 176 is a link 178. This link interconnects the rear conveyor arms 158 and the forward conveyor arms 168 so that both sets of conveyor arms rotate in unison between their extended positions of FIGS. 6 and 7 and their retracted positions of FIG. 8. Pivotally mounted on the near side plate 126 of the conveyor carriage 124 in FIG. 7 is a weight 180. This weight has an enlarged opening 182 through which the drive bar 138 extends. Pivotally connected at one end to the weight 180 is a link 184. The other end of link 184 is pivotally attached to an arm 186 rigid on one end of a sleeve 187 which rotates on the forward pivot shaft 166. At the other end of sleeve 187 is a releasable coupling 187a to be described shortly. This coupling, when engaged, connects the sleeve 187 to the forward pivot shaft 166 so that vertical swinging motion of the weight 180 rotates the conveyor arms 158, 168 in unison between their extended positions of FIGS. 6 and 7 and their retracted positions of FIG. 8. Rising of the weight extends the conveyor arms. Lowering of the weight retracts the arms. Lowering of the weight is limited to the position of FIG. 8, wherein the conveyor arms occupy their retracted positions, by a stop 180a.

During ascension of the conveyor drive bar 138 from the lower runs to the upper runs of the conveyor chains 136, the bar engages the upper end wall of the opening 182 in the weight 180. The weight, therefore, rises and falls with the drive bar as the latter travels back and forth between the upper and lower chain runs. During operation of the machine, the conveyor chains 136 are driven in the directions indicated. Accordingly, the drive bar 138 travels rearwardly towards the infeed end of the machine, that is, to the left in FIG. 7, along the lower runs of the chains and forwardly along the upper runs of the chains, the drive bar rising as it travels around the rear sprockets 132 and descending as it travels around the forward sprockets 134. It is apparent, therefore, that if the conveyor coupling 187a is engaged, the conveyor arms 158, 168 are extended at the rear end of the stroke of the infeed conveyor carriage 124 and remain extended during the forward stroke of the carriage. The arms are retracted at the forward end of the stroke and remain retracted during the rearward return stroke of the carriage.

In their extended positions, the conveyor arms are conditioned to feed top forming blanks 32 from Station One, through Station Two, to Station Three. When the arms are retracted, they are inactivated against feeding top forming blanks.

During normal operation of the machine, the conveyor arms 158 and 168 are extended during each forward stroke of the infeed conveyor carriage 124. For reasons which will appear presently, it is desirable under certain abnormal conditions to retain the arms in their retracted positions during the forward stroke of the carriage.

To this end, coupling 187a comprises an arm 188 which is pinned to the forward pivot shaft 166 of the infeed conveyor carriage 124, as may be best observed in FIGS. 8–10. Pivotally mounted intermediate its ends on the outer end of this arm is a coupling bar 190. Coupling bar 190 is rotatable between its solid line position in FIG. 10, which is hereinafter referred to as its engaged position, and its phantom line position, which is hereinafter referred to as its disengaged position. In its engaged position, the left or inner end of the coupling bar fits in a slot in an arm 192 rigid on the adjacent end of sleeve 187. The sleeve 187 is thereby keyed to the pivot shaft 166 and the coupling 187a is engaged so that the conveyor arms 158, 168 are extended and retracted as the infeed conveyor carriage weight 180 rises and falls with the conveyor drive bar 138 in the manner described earlier. When the coupling bar 190 occupies its phantom line disengaged position, the bar is retracted from the slot in arm 192 to permit the sleeve 187 to turn freely on the pivot shaft 166. Coupling 187a is thereby disengaged so that the conveyor arms remain in their retracted positions as the weight 180 rises and falls.

Coupling arms 188 and 192 are so oriented on the pivot shaft 166 and sleeve 187 that the arms extend vertically downward, as shown in FIG. 10, when the conveyor arms 158, 168 occupy their retracted positions of FIG. 8. The outer or right-hand end of the coupling bar 190, as the latter is viewed in FIG. 10, is weighted so that the bar tends normally to rotate to its full line engaged position of FIG. 10 when the coupling arms 188 and 192 are vertically disposed, as shown. The weighted outer end of the coupling bar 190 thus tends to normally retain the infeed conveyor coupling 187a in its engaged condition. Under normal operating conditions, therefore, the conveyor arms 158, 168 are extended during each forward stroke of the infeed carriage 124 and retracted during each return stroke of the carriage.

Selective retention of the conveyor arms in their retracted positions during the forward stroke of the infeed carriage is accomplished by a solenoid actuated cam mechanism 194 mounted on the frame 102 on that side of the path of the infeed carriage toward which the outer end of the coupling bar 190 projects. This cam mechanism comprises a cam 196 which is rotatably supported at its ends in bearings 198 fixed to the frame 102. The cam is rotatable about an axis parallel to the conveyor track 122 between a normal retracted position shown in solid lines in FIG. 10 and an extended position, shown in phantom lines. The cam has an eccentric counterweight 200 which urges the cam to its extended position. The cam is normally retracted by a solenoid 202 whose plunger is spring loaded against the cam, as shown. When the solenoid is energized, the plunger is retracted, thereby permitting the cam to swing to its extended position. The manner in which the solenoid is energized will be explained shortly.

Suffice it to say at this point that when the cam 196 is retracted, it is located out of the path of motion of the coupling bar 190. The infeed conveyor 120 is thus conditioned to feed top forming blanks 32 from Station One to Station Three. When cam 196 is extended in response to energizing of the cam solenoid 202, it is located in the path of movement of the outer end of the coupling bar 190 during the rearward return stroke of the infeed carriage 124. It will be recalled that during this return stroke, the conveyor arms 158, 168 are retracted and the coupling arms 188, 192 are vertically positioned, as in FIG. 10. The cam 196 is disposed to engage the outer end of the coupling bar 190 just prior to arrival of the infeed carriage 124 at the rear end of its stroke. The cam rotates the coupling bar to its phantom line disengaged position of FIG. 10, thereby disengaging the coupling 187a. Accordingly, the conveyor arms 158, 168 remain retracted during subsequent elevation of the weight 180 with the conveyor drive bar 138 at the rear end of the carriage stroke as well as throughout the following forward stroke of the carriage. The infeed conveyor is thus inactivated against feeding top forming blanks 32 from Station One to Station Three.

During the next return stroke of the infeed carriage 124, the coupling arms 188, 192 are re-aligned and the weight on the coupling bar 190 returns the latter to its solid line engaged position of FIG. 10. If the cam 196 remains extended, the coupling bar is again cammed to its disengaged position near the end of the return stroke and the conveyor arms 158, 168 remain retracted during the following forward stroke of the infeed carriage. This action is repeated, and the infeed conveyor 120 remains inactivated, until the cam 196 is again retracted by energizing of its solenoid 202. When this occurs, the coupling bar 190 remains in its engaged position at the end of the return stroke of the infeed carriage 124, whereby the conveyor arms 158, 168 are extended, as described earlier.

During operation of the forming machine, the sprocket chains 136 are driven in unison to drive the infeed carriage 124 back and forth along its supporting track 122. Assuming that a top forming blank 32 is currently located at Station One, as in FIGS. 5a and 6, the conveyor arms 158, 168 on the infeed carriage 124 are extended upwardly underneath the inner end wall forming panels 54 and the cross partition forming panels 60 of the blank as the drive bar 138 for the carriage travels around rear sprockets 132 from the lower runs to the upper runs of the conveyor chains 136. Panels 54 and 60 are thereby deflected upwardly slightly by the conveyor arms, as shown. During subsequent forward movement of the infeed carriage from Station One, the rear conveyor arms 158 engage the adjacent edges of the top forming blank, and the lips 164 on the arms engage over these blank edges, as shown best in FIG. 6, to feed the blank laterally toward Station Two. When the infeed carriage reaches the end of its forward stroke, the top forming blank 32 is situated at Station Two. The direction of travel of the carriage is now reversed to return the carriage to Station One. During this reversal, the carriage drive bar 138 travels around the forward sprockets 134 from the upper runs to the lower runs of the conveyor chains 136. This permits the weight 180 to descend and thereby rotate the conveyor arms 158, 168 rearwardly to their retracted positions of FIG. 8. The rear conveyor arms are thus disengaged from the top forming blank 32, thereby leaving the latter at Station Two.

During the next forward stroke of the infeed carriage, the rear conveyor arms 158 again advance a top forming blank 32 from Station One to Station Two. In addition, during this forward stroke of the infeed carriage, the forward conveyor arms 168 on the carriage engage the trailing edge of the first top forming blank 32 currently at Station Two, as shown in FIGS. 5a and 6, and feed the latter blank forwardly from Station Two to Station Three.

The lips 172 on the forward conveyor arms engage over the trailing edge of the blank as they feed the latter forwardly. Upon reaching the forward end of its stroke, the infeed carriage 124 again returns rearwardly, leaving the first top forming blank at Station Three and the second top forming blank at Station Two. During the subsequent forward stroke of the infeed carriage, a third top forming blank 32 is advanced from Station One to Station Two and the second blank is advanced from Station Two to Station Three. The first blank is concurrently advanced from Station Three to Station Four, in the manner explained below.

It is evident, therefore, that during normal operation, the infeed conveyor 120 operates to successively and intermittently feed top forming blanks 32 from Station One to Station Two and then from Station Two to Station Three. If the cam solenoid 202 is energized, the infeed conveyor is inactivated and the top forming blanks currently at Stations One and Two remain there until the solenoid is again de-energized.

Mounted on the frame bed 110 at Station Two are folding means 204 which may be best seen in FIG. 5b. These folding means serve to erect the inner end wall forming panels 54 and the cross partition forming panels 60 of each top forming blank 32 as the latter advances from Station One to Station Two. Folding means 204 comprise four plows including two outer plows 206 and two center plows 208. The two outer plows 206 operate on the inner end wall forming panels 54 of each top forming blank 32 and the two center plows 208 operate on the two cross partition forming panels 60 of each blank. The four plows 206 and 208 are conventionally shaped and each consists of a long, thin metal plate which extends in the direction of movement of the blanks 32 and is twisted about its longitudinal axis in such manner that the left end of each plow, as viewed in FIGS. 5b and 6, is disposed approximately in a horizontal plane and the right end of each plow is disposed approximately in a vertical plane. Each plow tapers toward its left end, as shown. Extending crosswise over the frame bed 110 at frame leg 104, a distance above the bed, is a bridge 210 having at its ends depending legs 212 which are rigidly secured to the side frame members 112 of the bed. Indicated at 214 are a pair of supporting bars which extend lengthwise of the frame leg 104, a distance above the bed 110, between the pairs of adjacent outer and inner plows 206 and 208, respectively. The left ends of the supporting bars, as viewed in FIG. 5b, are rigidly secured to the underside of the bridge 210. Attached by bolt and slot connections 216 to the right ends of the supporting bars 214 are brackets 218 which are welded or otherwise rigidly secured to the confronting surfaces of the adjacent plows 206 and 208. It is evident, therefore, that each supporting bar 214 supports one outer plow 206 and one inner plow 208. The bolt and slot connections 216 enable vertical and angular adjustment of each plow relative to the frame bed 110 to permit the plows to be properly positioned to perform their panel folding function.

When the plows 206, 208 are thus properly positioned, they are spaced a slight distance above the bed 110 to permit unobstructed movement of the top forming blanks 32 therebelow from Station One to Station Two. It will be recalled that each top forming blank 32 is fed laterally from Station One to Station Two by the rear conveyor arms 158 on the infeed carriage 124 and that these arms protrude upwardly through the center opening in each blank, thereby deflecting the inner wall forming panels 54 and cross partition forming panels 60 upwardly at a slight angle. The left ends of the plows 206 and 208 are properly located above the frame bed 110 to engage underneath these upwardly deflected panels of each top forming blank as the latter is fed forwardly from Station One to Station Two; that is to say, the two outer plows 206 engage under the two inner wall forming panels 54 of each top forming blank and the two center plows 208 engage under the cross partition forming panels 60 of the blank. It is evident, therefore, that as each top forming blank 32 advances laterally from Station One to Station Two, the two inner end wall forming panels 54 of the blank are progressively erected or folded upwardly about their hinge lines 40 by the two outer plows 206 and the two cross partition forming panels 60 of the blank are erected or folded upwardly about their hinge lines 42, 44 by the two center plows 208. Upon arrival at Station Two, therefore, each top forming blank is partially erected, as shown in FIGS. 1, 5a and 6.

At Station Two of the machine is a holder 220 for positioning an inverted bottom forming blank 34 in mating relation to each partially erected top forming blank 32 arriving at Station Two. Holder 220 comprises a pair of angles 222 opposite sides of the frame leg 104. One end of these angles is rigidly secured to the underside of the bridge 210. The other ends of the angles are rigidly secured to a pair of upstanding supporting posts 224 on the center frame leg 106. Angles 222 have coplanar, inwardly directed flanges 222a and vertically disposed flanges 222b. The lower edges of the vertical flanges are spaced slightly from the bed 110 to accommodate the ends of the top forming blanks 32 therebetween. Bolted to each of the angles 222 is an upstanding wall 226, the upper edge portion of which turns outwardly at a small angle. Extending between and supported by the right ends of the walls 226 is a transverse wall 228. The lower edge of this transverse wall is spaced a slight distance above the horizontal flanges 222a of the angles 222 and is slotted at 228a for reasons to be seen shortly. Hinged to the rear side of the transverse wall 228, that is, the right-hand side of the wall as the latter is viewed in FIG. 6, is a locator 229. Locator 229 is weighted to normally assume its positon of FIG. 6.

The horizontal flanges 222a of angles 222 and the walls 226 and 228 define a well 230 for receiving a bottom forming blank 34 in such manner that one edge of the blank abuts the locator 229 and rests on the flanges 222a and the opposite edge of the blank rests on the bridge 210, in the manner shown in FIG. 6. The blank is thereby positioned in vertically spaced relation to the bed 110 and disposed at a small angle relative to the bed. The blank is located crosswise of the bed by the side walls 226 of the well 230 in such manner that the forward end walls of its locking slots 76 and 78 are located in the path of movement of the locking tabs 56 and glue flaps 62, respectively, of a partially erected top forming blank 32 advancing from Station Two to Station Three.

It is evident, therefore, that if a bottom forming blank 34 is placed in the well 230 prior to advancing of each top forming blank 32 from Station Two to Station Three, the locking tabs and glue flaps on the advancing top forming blank engages in the locking slots in the bottom forming blank positioned in the well 230, whereby the bottom forming blank is carried forwardly with the advancing top forming blank to Station Three of the machine. During this forward advance of the bottom forming blank 34 from the well 230, the blank slides forwardly along the flanges 222a and through the space between the forward ends of these flanges and the under edge of the transverse wall 228. The hinged locator 229 swings forward to accommodate movement of the blank from the well. The slots 228a in the transverse well wall 228 provide clearance for the upstanding tabs and glue flaps on the advancing top forming blank.

It is evident at this point, then, that as each top forming blank 32 advances forwardly through the machine from Station One through Station Two to Station Three, its inner end wall forming panels 54 and cross partition forming panels 60 are erected and a bottom forming blank 34 is mated with the partially erected top forming blank. Upon arriving at Station Three, therefore, each set of mating top and bottom forming blanks appears as shown at Station Two in FIG. 3.

In the event a bottom forming blank 34 is not positioned in the well 230 to mate with the top forming blank currently at Station Two, it is desirable to terminate feeding of the top forming blanks 32 from Stations One and Two. This is accomplished by energizing the solenoid 202 to effect extension of conveyor inactivating cam 196 in FIG. 10. To this end, there is located at Station Two a switch 232 which is connected in circuit with cam solenoid 202. Switch 232 is operated by a pivot arm 234 having one end 234a disposed for engagement by a bottom forming blank 34 in well 230. The arrangement is such that when no bottom forming blank is positioned in the well 230, switch 232 is closed to energize the solenoid 202 and thereby effect extension of cam 196 to inactivate the infeed conveyor 120, as explained earlier. When a bottom forming blank 34 is placed in the well, it engages the switch arm 234 to open switch 232 and thereby de-energize the solenoid 202 to restore the infeed conveyor to its normal operative condition.

*Forming Station Three (FIGS. 4–7 and 11)*

A Station Three of the machine is a folding mechanism 300 which operates to fold downwardly the side wall forming panels 64 and corner connecting flaps 66 of the bottom forming blank 34 of each set of mating top and bottom forming blanks 32, 34 arriving at Station Three. Also located at Station Three is a crossfeed conveyor 302 for subsequently feeding each set of mating top and bottom forming blanks endwise from Station Three to Station Four. Folding mechanism 300 will be described first. This folding mechanism comprises an open, rectangular framework 304 to the corners of which are welded or otherwise rigidly secured bearing sleeves 306. These bearing sleeves are slidably supported on the upstanding supporting posts 224 and a second pair of upstanding supporting posts 308. The bearing sleeves are positioned on the posts by means of nuts threaded on the posts above and below the bearing sleeves. The lower ends of the supporting posts 224 and 308 are slidably received in bearing sleeves 310 which are rigidly secured to the bed 110. Threaded on the lower ends of the supporting posts, above and below the lower bearing sleeves 310, are nuts which vertically position the supporting posts relative to the bearing sleeves. It is evident, therefore, that the framework 304 of the folding mechanism 300 may be vertically adjusted relative to the bed 110.

Below the rear or left-hand end of bed 110 at Station Three is a hollow enclosure 312 having a door or doors (not shown) to provide access to the interior of the enclosure. The upper side of the enclosure 312 opens to the bed 110 at the center frame leg 106. The bed includes rails 314 which support top forming blanks 32 for movement from Station Three to Station Four. The upper surface of the left-hand end of bed 110 at the center frame leg 106 is disposed in the same plane as the upper surface of the bed 110 at frame leg 104. Also, the framework 304 of the folding mechanism 300 is located a distance above the bed 110 to clear the erected inner wall forming panels 54 and cross partition forming panels 60 of each top forming blank 32 as the latter advances from Station Two to Station Three. Top forming blanks may thus move unobstructedly from Station One to Station Three.

Extending across the rectangular opening in the framework 304, in a direction parallel to the direction of movement of the top forming blanks from Station One to Station Three, are three crossbars 316. These crossbars are welded or otherwise rigidly secured at their ends to the framework. A fourth crossbar 318, which is somewhat shorter than one-half the length of the other crossbars, is located close to the center crossbar 316, between the latter and the right-hand crossbar 316 in FIG. 5, and is welded at one end to the side of the framework 304 nearest Station Two. Fixed to the undersides of the crossbars 316 and 318 are bearing rails 320. The ends of the crossbars 316 and 318 nearest Station Two are beveled, as shown, to guide the bottom forming blank 34 of each set of mating blanks advancing from Station Two under the upper rails 320 of Station Three. The crossbars 316, 318 are located so that the two outer bars are situated directly outboard of the paths of movement of the upstanding locking tabs 56 on each top forming blank 32 advancing from Station Two to Station Three. The center crossbar 316 and the short crossbar 318 are located to straddle the upstanding glue flaps 62 on each top forming blank advancing to Station Three. The bearing rails 320 are interrupted, as shown, to accommodate the tabs and glue flaps on the advancing blanks. The crosbars 316 have notches 322 in their under surfaces to accommodate the tabs and flops during subsequent movement of the blanks from Station Three to Station Four by the crossfeed conveyor 302.

Rigidly fixed to the crossbars 316 are a first set of coaxial bearing sleeves 324 and a second set of coaxial bearing sleeves 326. The common axes of these bearing sleeve sets extend lengthwise of the center frame leg 106. Journaled in each of these bearing sleeve sets is a pivot shaft 328. Rectangular folding plates 330 are rigidly fixed along one edge to one of the shafts 328 between the crossbars 316. Similar rectangular folding plates 330 are rigidly fixed along one edge to the other pivot shaft between the crossbars. Fastened to one end of one of the pivot shafts 328 is an arm 332. The corresponding end of the other pivot shaft 328 rigidly mounts a bell crank 334. A link 336 is pivotally connected at one end to arm 332 and at the other end to one arm of bell crank 334, whereby folding plates 330 may be rotated in unison between their solid line retracted positions of FIG. 6, wherein the plates are located in a common horizontal plane, and their phantom line extended positions, wherein the folding plates are located in two parallel vertical planes.

The folding plates are thus rotated between their extended and retracted positions by operating mechanism contained within the enclosure 312 of the frame leg 106. Referring to FIG. 7, this operating mechanism will be seen to comprise a shaft 338 which extends lengthwise of the center frame leg 106 and is rotatably supported on the frame 102 by bearings 340. On one end of shaft 338 is keyed an arm 342. A link 344 is pivotally connected at one end to the outer end of this arm and at the other end to one arm of a bell crank 346 pivotally supported on frame 102. A second links 348 is pivotally connected at one end to the other arm of bell crank 346 and at the other end to the other arm of bell crank 334 (FIG. 11).

It is evident from the preceding description that the folding plates 330 may be rotated between their horizontal retracted positions and their vertical extended positions of FIG. 6 by oscillation of shaft 338. To effect such oscillation, there is rigidly fixed on the shaft 338 an arm 350 mounting a cam roller 352. Cam roller 352 engages a cam 354 keyed on a stub shaft 356 which is rotatably supported at its ends in bearings 358 fixed to the frame 102. Stub shaft 356 has keyed thereon a large sprocket 360 around which and a smaller sprocket 362 keyed on a shaft 364 is trained a sprocket chain 366. Shaft 364 parallels and is substantially coextensive with shaft 338 and is rotatably supported in bearings 368 fixed to the frame 102. Keyed on shaft 364 are a pair of sprockets 370 around which are trained the sprocket chains 146 for driving the infeed conveyor 120. Rotation of shaft 364 is thus effective to drive the infeed conveyor 120 as well as to drive the cam 354 and thereby oscillate the cam follower arm 350. Oscillation of this arm rotates the folding plates 330 between their extended and retracted positions.

At this point, then, it is evident that when the shaft 364 is driven in rotation, the infeed conveyor 120 and the folding mechanism 300 are driven in timed relation. The infeed conveyor and the folding mechanism are so synchronized that the folding plates 330 of the folding mechanism remain in their horizontal retracted positions during each forward stroke of the infeed conveyor carriage 124 to advance a mating set of top and bottom forming blanks from Station Two to Station Three. The folding plates are then swung downwardly to their vertical extended positions during reversal and the subsequent return stroke of the infeed carriage. Each mating set of blanks delivered to Station Three by the infeed conveyor is advanced to a position in which the blanks are centered with respect to the folding plates 330. As a consequence, when the folding plates swing downwardly to their vertical extended positions, they engage and fold downwardly the side wall forming panels 82 and corner connecting flaps 84 of the bottom forming blank 34. Immediately thereafter, the folding plates return to their horizontal retracted positions wherein they remain in readiness for the next set of mating blanks delivered to Station Three by the infeed conveyor 120.

The crossfeed conveyor 302 operates in timed relation to the folding mechanism 300 in such manner that upon return of the folding plates 330 to the horizontal retracted positions following a folding operation on a bottom forming blank at Station Three, the crossfeed conveyor advances the blanks from Station Three to Station Four. This crossfeed conveyor will now be described by reference to FIGS. 5a, 6 and 7.

Crossfeed conveyor 302 comprises a horizontal supporting track 372 which extends lengthwise of the frame leg 106 from Station Three to Station Four and is rigidly mounted at its ends on the frame 102. The crossfeed conveyor track 372, like the infeed conveyor track 122, is oriented with its faces inclined at 45° angles to the vertical. Supported on the crossfeed conveyor track 372 is a crossfeed carriage 374 which is essentially identical to the basic carriage of the infeed conveyor and, therefore, will not be described in detail. Suffice it to say that the supporting rollers 376 of the crossfeed carriage 374 have V-shaped peripheral grooves engaging the track 372, whereby the carriage is adapted for free movement lengthwise of the track but is restrained against rotation about the longitudinal axis of the track. Rotatably mounted on the bed 110, at each side of the track 372, are a pair of coplanar sprockets 378 (only one sprocket of each pair shown). Trained about each pair of sprockets 378 is a sprocket chain 380. A drive bar 382 extends through vertically elongated slots 383 in the carriage 374 and is fixed at its ends to the sprocket chains 380 so that when the latter chains are driven in unison, the carriage 374 is driven back and forth along its supporting track 372 in precisely the same way as the infeed carriage 124.

Sprocket chains 380 are driven in unison as follows: Sprockets 378 are rigidly mounted on stub shafts 384 (only one shown) which are rotatably supported in bearings 386 on the frame 102. Fixed to the shafts 384 are small sprockets 388 (only one shown). Below and parallel to the shafts 384 is a shaft 390 rotatably supported at its ends in bearings 392 (only one shown) mounted on the frame 102. Shaft 390 has keyed thereon a pair of large sprockets 394 around which and the small sprockets 388 are trained sprocket chains 396. A bevel gear 398 keyed on one end of shaft 390 meshes with a second bevel gear 400 keyed on shaft 364. Shafts 364 and 390 thus rotate in unison. Shaft 364 is drivably coupled to a motor 402 through reduction gearing 404, whereby the infeed conveyor 120, the folding mechanism 300, and the crossfeed conveyor 302 are driven in timed relation by the motor 402.

Rigidly mounted on the forward end of the crossfeed carriage 374 is a yoke 406 having short upstanding arms 406a. Pivotally mounted at their lower ends on these yoke arms are a pair of conveyor arms 408. The upper ends of the conveyor arms are bent forwardly to form blank engaging lips 410. A pair of weights 412 are pivotally mounted on opposite sides of the crossfeed carriage 374 for swinging about an axis parallel to the carriage drive bar 382. These weights have enlarged openings 414 through which the drive bar extends. Each weight is pivotally connected to its adjacent conveyor arm 408 by a link 416 so that each conveyor arm is rotated between its full line extended position and its phantom line retracted position of FIG. 7 by vertical swinging of its respective weight 412. When the sprocket chains 380 are driven in unison to drive the crossfeed carriage 374 back and forth along its track 372, the drive bar 382 oscillates up and down in the slots 383 in the crossfeed carriage, thereby swinging the weights 412 about their pivot axis to rotate the conveyor arms 408 between their extended and retracted positions in timed relation to the reciprocating motion of the crossfeed carriage in much the same manner as described earlier in connection with the conveyor arms of the infeed carriage 124. During operation of the machine, the conveyor chains 380 are driven in the direction indicated. Thus, the conveyor arms rotate up and forwardly to their extended positions as the drive bar 382 rises to the top runs of the sprocket chains 380 at the rear end of the stroke of the crossfeed carriage and the conveyor arms rotate rearwardly and down to their retracted positions as the drive bar 382 descends to the lower runs of the sprocket chains 380 at the forward end of the latter stroke.

Reference is now made to FIG. 5a in which it will be observed that the conveyor arms 408, in their extended positions, project above the upper surface of the bed 110 at frame leg 106, through the spaces between the supporting rails 314 and side frame members 418 of the latter leg. In these extended positions, the conveyor arms 408 are disposed for engagement with the adjacent edges of the set of mating top and bottom forming blanks 32 and 34 at Station Three, with the lips 410 on the arms engaging over the bottom forming blank 34, in the manner shown.

During the forward stroke of the crossfeed carriage 374, the set of mating blanks is fed endwise along the frame leg 106 from Station Three to Station Four. As noted earlier, the infeed conveyor 120, the folding mechanism 300 at Station Three, and the crossfeed conveyor 302 operate in timed relation in such manner that the folding plates 330 of the folding mechanism remain retracted until a set of mating top and bottom forming blanks is advanced to Station Three by the infeed conveyor. Immediately thereafter, the folding plates 330 are rotated downwardly to their vertical extended positions to fold downwardly the side wall forming panels 82 and corner flaps 84 of the underlying bottom forming blank 34, after which the plates are returned to their horizontal retracted positions. The crossfeed conveyor 302 and the folding mechanism 300 are synchronized so that just prior to return of the folding plates 330 to their horizontal retracted positions, the crossfeed carriage 374 commences its forward stroke to feed the set of mating top and bottom forming blanks from Station Three to Station Four. The folding plates remain extended to retain the side wall forming panels and corner flaps of the advancing bottom forming blank folded until the set of blanks enters Station Four.

Each set of mating top and bottom forming blanks thus transferred from Station Three to Station Four travels past a glue applicator mechanism 420 (FIGS. 5a and 6) which operates to apply glue to the upper surfaces of the yet unfolded side wall forming panels 64 and corner connecting flaps 66 of the advancing top forming blanks 32. Applicator mechanism 420 comprises a pair of glue heads 422 carried by a supporting structure 424 which is supported on the adjacent upstanding supporting posts 308 for pivotal movement about a horizontal axis transverse to the frame leg 106. The glue heads 422 are located to engage the upper surfaces of the side wall forming panels 64 and corner connecting flaps 66 of the top forming blanks 32 as the latter advance from Station Three to Station Four. FIG. 18 illustrates a glue head 422 which is typical of all the glue heads in the machine. It will be observed that each glue head 422 is supplied with glue under pressure through an inlet 426. At the underside of the glue head is a trigger 428 which controls glue discharge ports (not shown) in the head. Normally these ports are closed. When the trigger 428 is depressed, the ports are opened to permit the head to dispense glue. As each top forming blank 32 travels past the glue heads 422 between Stations Three and Four, the side wall forming panels 64 and corner flaps 66 of the blank engage the triggers 428 to effect dispensing of glue from the applicator heads to the upper surfaces of the panels and flaps. When no top forming blank is located beneath the glue heads 422, the triggers 428 of the heads are spaced slightly from the bed 110 so that glue does not continuously drain from the heads.

*Forming station four (FIGS. 4–7, 12 and 13)*

Station Four of the machine is located at the forward or right-hand end of the center frame leg 106. The bed 110 of the machine frame 102 at Station Four is located a distance below the bed 110 at Station Three, as may be best observed in FIGS. 5 and 5a. The frame 102 at Station Four has a pair of upright supporting posts 430, the upper ends of which are located at the level of the bed 110 at Station Three. Extending between and rigidly secured to the ends of the outer frame members 418 of Station Three and to the upper ends of the posts 430 are supporting rails 432. The upper surfaces of rails 432 are located in the plane of the upper surface of bed 110 at Station Three. As mentioned earlier, each set of mating top and bottom forming blanks is advanced in the endwise direction from Station Three to Station Four by the crossfeed conveyor 302. The travel of carriage 374 of this conveyor is such that each set of blanks is advanced to a terminal position at Station Four wherein the side wall forming panels 64 and corner connecting flaps 66 of the top forming blank 32 are supported on the rails 432 and the blank is centered endwise over the underlying bed 110 at Station Four. In this terminal position, the end edges of the blanks clear the right-hand end of the bed 110 at Station Three. The spacing between the rails 432 is such that the inner edges of these rails are located just outboard of the hinge or fold lines 36 of a top forming blank 32 supported on the rails.

Indicated at 434 in FIGS. 5 and 12 are a pair of angles extending parallel to the rails 432 at Station Four. These angles are mounted at one end on the upper ends of posts 430 by means of upstanding brackets 436. The opposite ends of these angles are attached to the frame 304 for the Station Three folding mechanism 300. Angles 434 have upwardly directed horizontal flanges 438 which are disposed to bear against the bottom forming panel 74 of the bottom forming blank 34 of a set of mating blanks 32, 34 in the aforesaid terminal position at Station Four. Angles 434 also have downwardly directed vertical flanges 440 which are disposed to bear against the downwardly folded side wall forming panels 82 and corner connecting flaps 84 of the bottom forming blank, thereby to retain such panels and flaps in their folded positions. In connection with this function of the angles 434, it will be recalled that the side wall forming panels and corner connecting flaps of the bottom forming blank of each set of mating blanks 32, 34 are folded downwardly at Station Three by the folding plates 330 of the folding mechanism 300 and that these plates remain in their vertical extended position during initial advance of the blanks from Station Three to Station Four. These plates, then, serve to retain the side wall forming panels and corner connecting flaps of each bottom forming blank in their folded positions at least until the leading edges of the panels have entered between the vertical flanges 440 of the angles 434 at Station Four.

Station Four comprises a vertically movable pusher mechanism 442 for forcing each set of mating top and bottom forming blanks 32 and 34 from their terminal position on the supporting rails 432, downwardly between these rails onto the lower bed 110 at Station Four, and a transfer conveyor 444 for thereafter feeding the blanks laterally from Station Four to Station Five. Pusher mechanism 442 comprises a pair of vertical guide rods 446 which are welded or otherwise rigidly fixed at their lower ends to the rear end of the lower bed 110, that is, the left end of the bed as the latter is viewed in FIGS. 12 and 13. The upper ends of these rods extend a distance above the upper surfaces of the supporting rails 432. The upper ends of the guide rods are secured to plates 448 which are welded to the upper ends of a pair of upstanding angles 450 rigid on the machine frame 102.

Guide rods 446 slidably support a pusher 452 for vertical movement between the blank positioning angles 434 at Station Four. Pusher 452 comprises horizontal supporting arms 454 rigidly joined at their rear ends to bearing sleeves 456 slidably mounted on the guide rods 446. Arms 454 are reinforced by braces 458 which extend between the arms and bearing sleeves, as shown. The outer ends of the pusher arms 454 are rigidly joined by a crosspiece 460. Welded or otherwise rigidly secured to the outer ends of the arms 454 are a pair of parallel, horizontal supporting bars 462. Fixed in the ends of these bars, and depending below the bars, are four vertical supporting rods 464 arranged in a rectangular pattern, as shown. A horizontal, rectangular pusher frame 466 is rigidly attached to the lower ends of the rods 464 for engagement with the bottom forming panel 74 of an underlying bottom forming blank 34 in terminal position on the supporting rails 432 at Station Four. This frame includes crossmembers 467 which are notched, as shown, to clear the upstanding locking tabs 56 and glue flaps 62 on the erected inner end wall forming panels 54 and cross partition forming panels 60 of the respective mating top forming blank 32 during advancing of the blanks from Station Three to Station Four.

Pusher 452 is vertically reciprocated in timed relation to the operation of the crossfeed conveyor 302 as follows: Pinned or otherwise rigidly fixed at one end on the rock shaft 338 in FIGS. 7 and 12 are a pair of arms 468. The free ends of arms 468 are pivotally connected to the lower ends of links 470, the upper ends of which are pivotally attached to the pusher bearing sleeves 456. The vertical swinging movement of the arms 468 occasioned by the oscillation of the rock shaft 338 thus imparts vertical oscillation to the pusher 452. Since the rock shaft 338 is oscillated by cam 354 in timed relation to reciprocation of the crossfeed conveyor carriage 374, the pusher 452 is reciprocated in timed relation to the opertion of the crossfeed conveyor.

The operation of the crossfeed conveyor 302 and the pusher 452 are so synchronized by proper shaping of cam 354 that the pusher remains in its upper solid line retracted position of FIG. 12 during each forward stroke of the crossfeed carriage 374 until the set of mating top and bottom forming blanks 32, 34 being advanced by the carriage reach their terminal position on the supporting rails 432 at Station Four. As the blanks enter Station Four, the bottom forming blank rides under the pusher frame 466 and the upstanding locking tabs 56 and glue flaps 62 on the underlying top forming blank pass through the notches in the crossmembers 467 of the pusher frame. Immediately after arrival of the blanks at their terminal position at Station Four, the high point of the rock shaft cam 354 rotates out of engagement with the cam follower 352, whereby the pusher operating arms 468 commence their downward swing to permit descension of the pusher 452 under its own weight and additional spring force, if necessary. The pusher frame 466 thereby presses down on the underlying bottom forming blank 34 and forces the latter and its mating top forming blank 32 downwardly between the suporting rails 432 onto the underlying bed 110 at Station Four. As the top forming blank 32 is thus forced between the rails, its now adhesively coated side wall forming panels 64 and corner connecting flaps 66 are folded upwardly into contact with the downwardly folded side wall forming panels 82 and corner connecting flaps 84 of the bottom forming blank, as depicted in phantom lines in FIG. 12. The side wall forming panels and corner connecting flaps of the two blanks are thereby adhesively joined.

After the folding operation at Station Four, therefore, each set of mating top and bottom forming blanks defines a generally rectangular tubular structure open at its ends, as may be best observed in FIG. 3. Immediately after forcing each set of mating blanks to the lower level of Station Four, the pusher 452 returns to its upper retracted position to await the next set of mating blanks delivered by the crossfeed conveyor 302. The transfer conveyor 444 of Station Four now operates to feed the set of mating blanks currently at the lower level of Station Four toward Station Five of the machine. This transfer conveyor will now be described by reference to FIGS. 7, 12 and 13.

Transfer conveyor 444 comprises a conveyor carriage 472 which is identical to the basic infeed conveyor carriage 124 and the basic crossfeed conveyor carriage 374. Carriage 472 is supported on a track 474, in the same way as carriages 124 and 374, for movement lengthwise of the lower bed 110 at Station Four. The transfer carriage 472, therefore, will not be described in detail. Suffice it to say that the latter carriage is capable of free movement along its track 474 but is restrained against rotation about the longitudinal axis of the track as are the first two conveyor carriages of the machine. The transfer conveyor carriage 472 is driven back and forth along its track 474 by a sprocket chain drive 476 identical to those which drive the infeed conveyor carriage and the crossfeed conveyor carriage. The sprocket chains 478 of the chain drive 476 are driven from the main drive shaft 364 through sprocket chains 480. The transfer conveyor carriage 472, therefore, is driven back and forth along its supporting track 474 in timed relation to the vertical reciprocating motion of the pusher 452.

Rigidly fixed to the transfer conveyor carriage 472 and upstanding therefrom are a pair of arms 482 terminating at their upper ends in sleeves 484. Extending through these sleeves are threaded rods 486 mounting lock nuts 488 which axially position the rods relative to the sleeves. A conveyor plate 489 is welded or otherwise rigidly joined to the forward ends of the rods 486 and is disposed in a plane normal to the direction line of movement of the carriage. The ends of the conveyor plate 489 are turned to form forwardly directed lips 490.

When the transfer carriage 472 is at the rear end of its stroke, that is, at the left end of its stroke, as the carriage is viewed in FIGS. 7 and 12, conveyor plate 489 is retracted out of the path of vertical movement of mating top and bottom forming blanks from the upper level to the lower level of Station Four under the action of the pusher 452. During the subsequent forward stroke of the transfer carriage 472, as will be explained shortly, the conveyor plate 489 engages the set of mating top and bottom forming blanks currently at the lower level of Station Four and advances the blanks forwardly along the bed 110 toward Station Five. As the conveyor plate 489 initially approaches the blanks, its forwardly directed lips 490 straddle the blanks in the endwise direction and engage the adjacent or rear corner connecting flaps 66 of the top forming blanks 32 to fold the latter flaps and their respective bonded corner flaps 84 of the mating bottom forming blank forwardly across the open ends of the tubular tray structure at Station Four. The lips 490 retain the corner connecting flaps in their folded positions during subsequent movement of the blanks to Station Five.

As just explained, the transfer conveyor 444 operates in timed relation to the vertically movable pusher 452. The pusher and conveyor are so synchronized that the latter commences its froward stroke, to feed each set of mating, and now adhesively joined, top and bottom forming blanks 32, 34 from Station Four toward Station Five, upon upward return movement of the pusher toward its retracted position.

Mounted on the frame 102 at opposite sides of the bed 110 at Station Four, so as to straddle in the endwise direction each set of mating blanks emerging from Station Four, are a pair of rails 492. The ends of these rails nearest Station Four are turned out to facilitate entrance of the advancing blanks therebetween. Rails 492 engage the leading corner connecting flaps 66 of each top forming blank and fold the latter flaps, and their respective bonded corner connecting flaps 84 of the mating bottom forming blank, rearwardly toward the now folded rear flaps 66, 84. Upon emerging from Station Four, then, each set of mating top and bottom forming blanks 32, 34 have their side wall forming panels 64, 82 and their corner connecting flaps 66, 84 folded and adhesively joined.

Mounted on the rear side of the conveyor plate 489 is a switch 494. This switch is operated by an arm 496 which is pivoted on the conveyor plate and projects through a slot in the plate for engagement with each set of mating blanks transferred from Station Four by the transfer conveyor 444. Switch 494 is actuated in response to engagement of the switch arm 496 with blanks being transferred. The purpose of this switch will be explained shortly.

*Forming Station Five (FIGS. 4 and 14–18)*

The machine bed 110 at Station Five comprises bearing rails 500 which extend for a distance along the frame leg 108. Slightly spaced above the ends of bearing rails 500 nearest Station Four are additional short bearing rails 501. Rails 500 and 501 are spaced to receive therebetween the outer end wall forming panels 52 on the top forming blank of each set of mating adhesively joined blanks emerging from Station Four. The leading ends of the rails diverge, as shown, to guide the panels between the rails. A distance above each lower rail 500 are a pair of slightly spaced rails 502, 503. Rails 502 and 503 are spaced to receive therebetween the outer end wall forming panels 80 of the bottom forming blank of each set of blanks emerging from Station Four. The leading ends of these rails diverge, as shown, to guide the panels between the rails. Rails 502 are supported on bridge members 504 by adjustment screws 506. Rails 492, 501 and 503 are supported on the vertical sides of bridge members 504. Station Five, then, defines a generally rectangular passage extending lengthwise of the frame leg 108 through which each set of mating adhesively joined blanks passes after emerging from Station Four. About midway along this passage are a first pair of glue applicator assemblies 508 (only one shown) located at opposite sides of the passage and a second glue applicator assembly 510 situated above and generally centrally of the passage. Applicator assemblies 508 are identical. Referring to FIGS. 16 and 18, each assembly 508 comprises a glue head 422 (described earlier) which is mounted on a support 512 attached to a plate 514 secured to and located outboard of the respective outer bearing rail 500. Below each glue head 422 is an opening 516 in the respective bearing rail.

Mounted underneath each rail 500 opposite the respective glue head is a depending plate 518 on which is pivotally supported a lever 520. One end of each lever engages the plunger of a solenoid 522 attached to the respective supporting plate 518. The opposite end of the lever mounts a pad 524 which is situated in the respective bearing rail opening 516.

As each set of mating top and bottom forming blanks 32 and 34 advances through Station Five, the outer end wall forming panels 52 of the top forming blank pass between the glue heads 422 in the applicator mechanisms 508 and their respective underlying lever pads 524. The glue heads are stationarily positioned by their supports 512 so that the triggers 428 of the heads are normally spaced from the underlying end wall forming panels of each advancing set of mating blanks 32, 34. The panels 52 are engaged with the triggers, to effect dispensing of glue onto the upper surfaces of the panels, by energizing the solenoids 522 which rocks the levers 520 in directions to swing the lever pads 524 upwardly against the panels and thereby move the latter upwardly against the glue head triggers. The lever solenoids 522 are controlled by the switch 494 on the transfer conveyor carriage 472 of Station Four in such manner that the solenoids are energized to effect upward swinging of the lever pads 524 in the manner just explained, upon engagement of the actuating arm 496 for switch 494 with a set of mating blanks being transferred from Station Four by the transfer carriage. Within Station Five, each set of mating blanks is pushed forward by the preceding set of blanks so that the sets of blanks advance past the glue applicator mechanisms 508 only during the forward stroke of the transfer carriage 472. It is apparent, therefore, that the glue heads 422 of the applicator mechanisms 508 dispense glue to underlying outer end wall forming panels 52 of top forming blanks only during advancing of the blanks past the glue heads.

Also included in each glue applicator mechanism 508 is a second glue head 422 which is stationarily supported on the respective glue head supporting 514 by means of an arm 526. These latter glue heads are located to apply glue to the outwardly facing surfaces of the inwardly folded corner connection flaps 66 on each set of mating top and bottom forming blanks 32, 34 advancing past the applicator mechanisms 508.

The upper, centrally located glue applicator mechanism 510 comprises a pair of glue heads 422 which are pivotally mounted, by bearings 530, on a supporting member 532 extending between and attached at its ends to the bridge members 504. Fixed to the upper ends of the pivot shafts for the latter glue heads are arms 534 between the outer ends of which is connected a spring 536. Spring 536 urges the upper glue heads toward a center guide 538 mounted on the underside of the supporting member 532, along the longitudinal center line of the rectangular passage of Station Five. These upper glue heads are preceded by a channel guide 540 fixed to the supporting member 532 and straddling the center guide 538.

As each set of mating top and bottom forming blanks 32, 34 advances through Station Five, the glue flaps 62 on the respective top forming blank 32 straddle the center guide 538 as they pass through the channel guide 540 and then between the following upper glue heads 422. The latter glue heads apply glue to the outwardly facing surfaces of the glue flaps 62.

The glue applicator mechanisms 508 are followed by two folding plates or plows 542 which are located at opposite sides of the bed 110 at Station Five. The upper rails 503, which position the outer end wall forming panels 80 on the bottom forming blank of each set of mating blanks advancing through Station Five, terminate just before the plows 542. These plows are supported at one end on the adjacent bridge member 504 and at the other ends on upstanding angles 544 welded to the frame 102. Plows 542 are located to engage and fold downwardly the outer end wall forming panels 80 on each set of advancing blanks as the latter panels leave the rails 503. These end wall forming panels are thereby folded into contact with and adhesively joined to the now inwardly folded and adhesively coated corner connecting flaps 66 of the respective top forming blank.

The transfer conveyor 444 of Station Four is effective to advance each set of blanks, through the intervening sets which are disposed in contact as shown in phantom lines in FIG. 14, to a terminal position at Station Six where the outer end wall forming panels 52 of the respective top forming blank 32 are supported on the right end of the supporting rails 500 in FIGS. 14 and 16. During each return stroke of conveyor 444, the blanks remain stationary in the positions of FIG. 14 wherein the forward glue heads of applicators 508 and the glue heads of applicator 510 are disposed out of glue dispensing contact with the adjacent blanks.

*Forming Station Six (FIGS. 4 and 14–16)*

The machine bed 110 at Station Six is located a distance below the bed 110 at Station Five and is composed of bearing rails 600 extending lengthwise of the frame leg 108. Located at Station Six is a vertically operable pusher mechanism 602 for depressing each set of mating blanks from its terminal position on the supporting rails 500 of Station Five to the lower bed 110 at Station Six. Each set of blanks is thereby forced between the rails 500 to effect upward folding of the adhesively coated outer end wall forming panels 52 of the respective top forming blank 32 against the now downwardly folded outer end wall forming panels 80 of the respective bottom forming blank 34. These inner and outer end wall forming panels are thereby adhesively joined to complete the produce tray forming operation of the machine.

Pusher mechanism 602 comprises a carriage 604 similar to the basic carriages of the infeed, crossfeed and transfer conveyors 122, 302 and 444 describd above. Carriage 604 is movably supported on a track 606 in the same way as the earlier carriages. Track 606 extends lengthwise of and is secured to the underside of the bed 110 at Station Six. Carriage 604 is driven back and forth along the track 606 by a conveyor chain mechanism 605 similar to those which drive the earlier conveyor carriages. Mechanism 605 comprises a pair of conveyor chains 608 located at opposite sides of the carriage and connected by a drive bar 610 which extends through slots in the carriage 604. The conveyor chains 608 are driven in unison by a motor 612.

Mounted on the carriage 604 is a cross member 614, the ends of which extend beyond the sides of the frame leg 108. Rigidly mounted on these extending ends of the cross member are vertical bearing sleeves 616. Shafts 618 are slidable in the bearing sleeves 616. The upper ends of shafts 618 are rigidly joined by a crossbar 620.

Pivotally mounted on the underside of each end of the cross member 614 is a bell crank 622. Pivotally connected at one end to one arm of each bell crank is a link 624, the other end of which is pivotally secured to the adjacent end of the crossbar 620 in the manner shown best in FIG. 16. The opposite arm of each bell crank 622 is offset inwardly toward the pusher carriage 604 and is pivotally connected to one end of a link 626. The other end of each link 626 (only one shown) is pivotally secured to one arm of a bell crank 628 (only one shown) which is pivotally mounted at 630 on the adjacent side of the carriage 604. The opposite arm of each bell crank 628 is slotted to receive the drive bar 610 in the manner shown best in FIG. 14.

It is apparent that the linkage comprising the links 624, bell cranks 622, links 626, and bell cranks 628 is so constructed and arranged that the crossbar 620 on the pusher carriage 604 is raised and lowered in timed relation to the back and forth reciprocating motion of the pusher carriage. During operation of the machine, conveyor chains 608 are driven in the directions indicated. The arrangement of the above linkage is obviously such that with the indicated direction of chain motion, the crossbar 620 descends during the right-hand forward stroke of the pusher carriage 604 in FIG. 14 and rises during the left-hand return stroke of the carriage.

Rigidly mounted on the underside of the crossbar 620 are a pair of pusher rails 632. When the crossbar 620 of the pusher mechanism 602 is elevated to its limit, there is sufficient clearance between the supporting rails 500 and the pusher rails to receive a set of mating top and bottom forming blanks 32, 34 therebetween. Drive motor 612 for the pusher mechanism 602 is controlled by a switch 634 mounted on the end of a supporting member 700 at Station Seven. This supporting member extends lengthwise of the frame leg 103, a distance above the latter, and is mounted on a pair of bridge members 701 at Station Seven.

Switch 634 is normally open and is closed to energize the motor 612 by engagement of a set of mating blanks 32, 34 thereagainst, as in FIG. 14. Associated with the switch is a holding relay (not shown) which locks the motor in energized condition to effect one cycle of operation of the pusher mechanism 602. Each such cycle involves one forward stroke of the pusher carriage 604 from its rearward limiting position of FIG. 14 and one return stroke of the carriage to the position of FIG. 14. During the forward stroke, the pusher rails 632 are lowered to force the set of mating top and bottom forming blanks 32, 34 currently at Station Six downwardly between the supporting rails 500 to the lower bed 110 at Station Six thereby to fold upwardly the outer end wall forming panels 52 of the respective top forming blank in the manner explained earlier. The forward motion of the pusher carriage 604 advances the respective set of mating blanks to Station Seven of the machine. To this end, the carriage mounts an upstanding conveyor plate 635 which engages each set of blanks after depression thereof by the pusher 602 to the lower level of Station Six.

*Forming Station Seven*
*(FIGS. 4, 14 and 15)*

At Station Seven, each set of mating top and bottom forming blanks 32, 34 is subjected to the final folding operation of the machine. This folding operation is performed by a plow 702 mounted on the underside of the supporting member 700. Plow 702 extends lengthwise of the frame leg 108 approximately along the center line of bed 110 at Station Seven. As each set of mating blanks is advanced to Station Seven by the pusher carriage 604 in the manner just explained, the plow 702 enters between the adhesively coated glue flaps 62 on the respective top forming blank to the fold the flaps away from one another and downwardly against the underlying bottom forming panel 74 of the respective bottom forming blank 34. At this time, the set of blanks is confined endwise between vertically disposed bearing rails 704 at opposite sides of the bed 110. Each set of mating blanks, which now forms a completed produce tray of the character shown in FIG. 3a, is left at Station Seven by the pusher carriage 604 which returns to its initial position at Station Six.

If the next set of blanks has been advanced, by the transfer conveyor 444, sufficiently to close the switch 634 at Station Six, the pusher mechanism 602 immediately commences its next cycle during which the previous completed produce tray is pushed forwardly from Station Seven to Station Eight by the following set of blanks. Otherwise, the pusher mechanism simply returns to its initial position and stops to await the next set of blanks advanced to Station Six by the transfer conveyor 444.

*Forming Station Eight (FIGS. 19 and 20)*

Each completed produce tray emerging from Station Seven is advanced through the final Station Eight of the machine by the pusher carriage 604; that is to say, the trays move through the final station in contact with one another so that each forward stroke of the pusher carriage advances all of the completed trays an equivalent distance through Station Eight. This latter station has a generally rectangular passage through which the completed trays move and includes a multiplicity of spring loaded pressure pads 800 arranged about and along the passage to maintain the adhesively bonded panels and flaps of each tray under compression until the glue has set properly.

*Summary of operation*

Summarizing the operation of the present forming machine, each top forming blank 32 is delivered in flat condition and in inverted position to Station One of the machine. The infeed conveyor 120 is rendered effective to feed the blank laterally from Station One to Station Two and subsequently from Station Two to Station Three in response to placement of each bottom forming blank 34 in the well 220 at Station Two. As each top forming blank is advanced from Station Two to Station Three, it carries along a mating bottom forming blank from Station Two.

At Station Three, the side wall forming panels 82 and corner connecting flaps 84 on the bottom forming blank 34 of the set of mating blanks are folded downwardly toward the underlying top forming blank by the folding mechanism 300. Thereafter, the blanks are fed endwise, past the glue heads 422 on frame leg 106, to Station Four of the machine by operation of the crossfeed conveyor 302. At Station Four, the blanks are depressed to the lower level of the latter station by the pusher mechanism 452, thereby folding upwardly the adhesively coated side wall forming panels 64 and corner connecting flaps 66 of the top forming blank.

The set of blanks is then again fed laterally through Station Five to Station Six by the transfer conveyor 444. As the blanks emerge from Station Four, their corner connecting flaps 66, 84 are folded inwardly toward one another. During subsequent movement of the blanks through Station Five, the corner flaps 66, 84, the outer end wall forming panels 52, and the glue flaps 62 on the top forming blank 32 are coated with glue.

These adhesively coated panels and glue flaps of the top forming blank 32 are folded, by operation of the pusher mechanism 602 and the plow 702, during passage of the set of blanks through Stations Six and Seven of the machine. Each set of mating blanks emerges from Station Seven as a completed produce tray. During passage of the trays through the final Station Eight of the machine, the adhesively coated panels and flaps of each tray are maintained under compression sufficiently long to assure that the glue has set properly.

What is claimed is:

1. In a machine for forming a produce tray from a pair of top and bottom forming blanks which are cut and creased to provide the top forming blank with hinged panels having parallel hinge lines along one edge of the respective panels and a projecting locking tab formation along the opposite edge of at least one panel, and to provide the bottom forming blank with a bottom forming panel having a locking slot to receive said tab formation after said panels of said top forming blank have been folded about said hinge lines to erected positions wherein the latter panels are located substantially in parallel planes approximately normal to said top forming blank, the combination comprising:

an elongate frame including a bed to slidably support said top forming blank with said panels thereof in said erected positions for movement from one station to a following station space along said frame, conveyor means on said frame for feeding said top forming blank from said one station to said following station, and supporting means on said frame at said one station for supporting said bottom forming blank in an initial position wherein said locking slot is disposed to mate with said tab formation on said top forming blank upon movement of the latter from said one station to said following station, whereby said bottom forming blank is carried to said following station by said top forming blank.

2. A forming machine according to claim 1 wherein: said top forming blank is adapted to be positioned on said bed with said hinge lines parallel to the direction line of movement of the latter blank from said one station to said following station, and said supporting means positions said bottom forming blank at an acute angle to said bed so that the latter blank approaches said bed in the direction of movement of said top forming blank and with said locking slot disposed in a plane parallel to said direction line and in the path of movement of said tab formation from said one station to said following station with said top forming blank.

3. A forming according to claim 1 including: means for normally inactivating said conveyor means against feeding said top forming blank from said one station to said following station, sensing means at said one station to be actuated by said bottom forming blank upon placement of the latter blank in said initial position, and means controlled by said sensing means for conditioning said conveyor means to feed said top forming blank from said one station to said following station in response to actuation of said sensing means by said bottom forming blank.

4. A forming machine according to claim 1 wherein: said conveyor means comprises a reciprocating carriage, blank engaging means mounted on said carriage for movement between an extended position wherein said blank engaging means is conditioned to feed said top forming blank from said one station to said following station and a retracted position wherein said blank engaging means is inactivated against feeding said top forming blank from said one station to said following station, and means for normally retaining said blank engaging means in retracted position, sensing means at said one station to be actuated by said bottom forming blank upon placement of the latter in said initial position, and means controlled by said sensing means for extending said blank engaging means during the forward storke of said carriage in response to actuation of said sensing means by said bottom forming blank.

5. A forming machine according to claim 1 including: sensing means at said one station to be actuated by said bottom forming blank upon placement of the latter in said initial position, cam means movably mounted on said frame adjacent said conveyor means and controlled by said sensing means so as to be moved from one position to another position in response to actuation of said sensing means by said bottom forming blank, and said conveyor means comprising a reciprocating carriage, blank engaging means mounted on said carriage for movement between an extended position wherein said blank engaging means are conditioned to feed said top forming blank from said one station to said following station and a retracted position wherein said blank engaging means are inactivated against feeding said top forming blank from said one station to said following station, means for normally retaining said blank engaging means in said retracted position thereof, and means engageable with said cam means during the forward stroke of said carriage when said cam means occupies said other position thereof for extending said blank engaging means.

6. In a machine for forming a produce tray from a pair of top and bottom forming blanks which are cut and creased to provide the top forming blank with hinged panels having parallel hinge lines along one edge of the respective panels and a projecting locking tab formation along the opposite edge of at least one panel, and to provide the bottom forming blank with a bottom forming panel having a locking slot to receive said tab formation after said panels of said top forming blank have been folded about said hinge lines to erected positions wherein the latter panels are located substantially in parallel planes approximately normal to said top forming blank, the combination comprising:

an elongate frame including a bed to slidably support said top forming blank for movement from one station, through an intermediate station, to a following station spaced along said frame, conveyor means on said frame for feeding said top forming blank from said one station, through said intermediate station, to said following station, folding means on said frame at said intermediate station for folding said panels of said top forming blank about said hinge lines to said erected position upon movement of said top forming blank from said one station to said intermediate station, and supporting means on said frame at said intermediate station for supporting said bottom forming blank in an initial position wherein said locking slot is disposed to mate with said tab formation on said top forming blank upon movement of the latter from said intermediate station to said following station, whereby said bottom forming blank is carried to said following station by said top forming blank.

7. A forming machine according to claim 6 wherein: said conveyor means comprises a reciprocating carriage, first blank engaging means on said carriage for feeding said top forming blank from said one station to said intermediate station during one forward stroke of said carriage, and second blank engaging means on said carriage for feeding said top forming blank from said intermediate station to said following station during a subsequent forward stroke of the carriage.

8. A forming machine according to claim 6 wherein: said conveyor means comprises a reciprocating carriage, first blank engaging means on said carriage for feeding said top forming blank from said one station to said intermediate station during one forward stroke of the carriage, second blank engaging means on said carriage for feeding said top forming blank from said intermediate station to said following station during a subsequent forward stroke of the carriage, said blank engaging means being mounted on said carriage for movement between retracted positions wherein the blank engaging means are inactivated again feeding said top forming blank and extended positions wherein said blank engaging means are conditioned for feeding said top forming blank, and means for normally retaining said blank engaging means in said retracted positions, sensing means at said intermediate station to be actuated by said bottom forming blank upon placement of the latter in said initial position, and means controlled by said sensing means for extending said blank engaging means during the forward stroke of said carriage in response to actuation of said sensing means by said bottom forming blank.

9. In a machine for forming a produce tray from a pair of blanks including a top forming blank which is cut and creased to provide the latter blank with two hinged inner end wall forming panels and two intervening hinged cross partition forming panels having parallel hinge lines and adapted to be folded about said hinge lines to erected positions wherein said panels are located substantially in parallel planes approximately normal to said top forming blank, the combination comprising:

an elongate frame including a bed to slidably support said top forming blank for movement along said frame, conveyor means on said frame for feeding said top forming blank along said bed, and folding means on said frame for folding said wall and partition forming panels of said top forming blank about said hinge lines to said erected positions during movement of the latter blank along said bed.

10. A forming machine according to claim 9 wherein: said folding means comprise four plows extending longitudinally of and spaced laterally of said bed for engagement with said wall and partition forming panels, respectively, and shaped to fold said panels to said erected positions upon movement of said top forming blank past said plows.

11. In a machine for forming a produce tray from a pair of top and bottom forming blanks including a top forming blank, the combination comprising:
- an elongate frame including a bed to slidably support said top forming blank, and
- conveyor means on said frame for feeding said top forming blank along said frame including a track on said frame parallel to and extending lengthwise of said bed, a carriage mounted on said track for movement therealong, a pair of endless conveyor chains on said frame at opposite sides of said carriage and having upper and lower runs parallel to said track, a drive bar extending between and drivably connected to said chains for movement with the latter, said drive bar extending through a slot in said carriage normal to said track, whereby said carriage is driven back and forth along said track and said drive bar moves back and forth in said slot when said conveyor chains are driven in unison, means for driving said conveyor chains in unison, and blank engaging means on said carriage engageable with said top forming blank for feeding the latter in one direction along said bed.

12. A forming machine according to claim 11 wherein: said blank engaging means are mounted on said carriage for movement between an extended position wherein said latter means are conditioned to feed said top forming blank along said bed and a retracted position wherein said latter means are inactivated against feeding said top forming blank along said bed, and means on said carriage operatively connected to said drive bar and to said blank engaging means for extending the latter means in response to movement of the drive bar toward one end of said slot and retracting said blank engaging means in response to movement of the drive bar toward the other end of said slot.

13. A forming machine according to claim 11 wherein: said blank engaging means are mounted on said carriage for movement between an extended position wherein said latter means are conditioned to feed said top forming blank along said bed and a retracted position wherein said latter means are inactivated against feeding said top forming blank along said bed,
- a weight pivoted on said carriage and having a slot receiving said drive bar, whereby said weight rises and falls as said drive bar moves in said carriage slot, and
- means operatively connecting said weight and said blank engaging means, whereby said latter means are extended when said weight rises and retracted when said weight falls.

14. In a machine for forming a produce tray from a pair of top and bottom forming blanks which are cut and creased to provide the top forming blank with hinged panels having parallel first hinge lines along one edge of the respective panels and a projecting locking tap formation along the opposite edge of at least one panel, and to provide the bottom forming blank with a bottom forming panel, side wall forming panels hinged about parallel second hinge lines to opposite edges of said bottom forming panel, and a locking slot in said bottom forming panel extending normal to said edges and adapted to receive said tap formation to locate said blanks with said first and second hinge lines normal to one another after said panels of said top forming blank have been folded about said first hinge lines to erected positions wherein the latter panels are located substantially in parallel planes approximately normal to said top forming blank, the combination comprising:
- an elongate frame including a bed to slidably support said top forming blank for movement from one station, through an intermediate station, to a following station spaced along said frame,
- conveyor means on said frame for feeding said top forming blank from said one station, through said intermediate station, to said following station,
- first folding means on said frame at said intermediate station for folding said panels of said top forming blank about said first hinge lines to said erected positions upon movement of said top forming blank from said one station to said intermediate station,
- supporting means on said frame at said intermediate station for supporting said bottom forming blank in an initial position wherein said locking slot is disposed to mate with said tab formation on said top forming blank upon movement of the latter from said intermediate station to said following station, whereby said bottom forming blank is carried to said following station by said top forming blank, and
- second folding means on said frame at said following station for folding said side wall forming panels of said bottom forming blank downwardly toward said top forming blank about said second hinge lines to positions wherein said side wall forming panels are disposed in planes approximately normal to said blanks.

15. In a machine for forming a produce tray from a pair of mating top and bottom forming blanks which are cut and creased to provide the top forming blank with hinged panels which are folded about parallel first hinge lines along one edge of the respective panels and normal to two opposing side edges of the latter blank to erected positions wherein said panels are disposed substantially in parallel planes approximately normal to the latter blank, a locking tab formation along the opposite edge of at least one panel, and side wall forming panels hinged to said side edges of said latter blank about parallel second hinge lines normal to said first hinge lines, and to provide said bottom forming blank with a bottom forming panel, side wall forming panels hinged to two opposite side edges of the latter blank about parallel third hinge lines, and a locking slot in said bottom forming panel extending normal to said third hinge lines and receiving said tab formation to relatively locate said blanks in such manner that said second and third hinge lines are parallel to one another and said side wall forming panels are foldable toward one another about the latter hinge lines, respectively, to erected positions wherein said latter panels are disposed in planes approximately normal to said blanks and in overlapping relation with the confronting surfaces of the side wall forming panels in contact with one another, the combination comprising:
- an elongate frame including a bed to slidably support said pair of mating blanks for movement from one station to a following station spaced along said frame,
- conveyor means on said frame for feeding said blanks from said one station to said following station,
- first folding means on said frame at said one station for folding the side wall forming panels of one blank to said erected positions thereof,
- second folding means on said frame at said following station for folding the side wall forming panels of the other blank to said erected positions thereof, and glue applicator means on said frame between said stations for applying glue to said surfaces of the side wall forming panels of one blank during movement of the blanks from said one station to said following station.

16. A forming machine according to claim 15 wherein: said first folding means are located above said bed and are movable downwardly toward the bed to fold the side wall forming panels of said bottom forming blank downwardly toward said top forming blank, and said second folding means are operative to fold the side wall forming panels of said top forming blank upwardly against the side wall forming panels of the bottom forming blank.

17. A forming machine according to claim 15 wherein: said first folding means are located above said bed and are movable downwardly toward the bed to fold the side wall forming panels of said bottom forming blank downwardly toward said top forming blank, and said second folding means comprises a pair of spaced parallel supporting rails at said following station for supporting the side wall forming panels of said top forming blank, and vertically movable pusher means on said frame above said rails for forcing said blanks downwardly between the rails, thereby to fold the side wall forming panels of said top forming blank upwardly against the side wall forming panels of said bottom forming blank.

18. In a machine for forming a produce tray from a pair of mating top and bottom forming blanks which are cut and creased to provide the top forming blank with hinged panels which are foldable about parallel first hinge lines along one edge of the respective panels and normal to two opposing side edges of the latter blank to erected positions wherein said panels are disposed substantially in parallel planes approximately normal to the latter blank, a locking tab formation along the opposite edge of at least one panel, and side wall forming panels hinged to said side edges of said latter blank about parallel second hinge lines normal to said first hinge lines, and to provide said bottom forming blank with a bottom forming panel, side wall forming panels hinged to two opposite side edges of the latter blank about parallel third hinge lines, and a locking slot in said bottom forming panel extending normal to said third hinge lines for receiving said tab formation after said first panels have been folded to said erected positions thereof to relatively locate said blanks in such manner that said second and third hinge lines are parallel to one another and said side wall forming panels are foldable toward one another about the latter hinge lines, respectively, to erected positions wherein said latter panels are disposed in planes approximately normal to said blanks and in overlapping relation with the confronting surfaces of the side wall forming panels in contact with one another, the combination comprising:

an elongate frame including a bed to slidably support said top forming blank for movement through a series of successive stations spaced along said frame, first conveyor means on said frame for feeding said top forming blank from the first station, through the second station, to the third station, first folding means on said frame at said second station for folding said folding said first panels of said top forming blank about said first hinge lines to said erected positions thereof upon movement of said top forming blank from said first station to said second station, supporting means on said frame at said second station for supporting said bottom forming blank in an initial position wherein said locking slot is disposed to mate with said tab formation on said top forming blank upon movement of the latter from said second station to said third station, whereby said bottom forming blank is carried to said third station by said top forming blank, second folding means on said frame at said third station for folding the side wall forming panels of said bottom forming blank downwardly to said erected positions thereof, second conveyor means for feeding said blanks from said third station to the fourth station, third folding means on said frame at said fourth station for folding the side wall forming panels of said top forming blank upwardly against the downwardly folded side wall forming panels of said bottom forming blank, and glue applicator means on said frame between said third and fourth stations for applying glue to the upwardly facing surfaces of the side wall forming panels of said top forming blank during movement of the blanks from said third station to said fourth station.

19. In a machine for forming a produce tray from a pair of mating top and bottom forming blanks which are cut and creased to provide the top forming blank with a pair of hinged outer end wall forming panels at opposite ends of the latter blank having parallel first hinge lines, a pair of hinged inner end wall forming panels having second hinge lines along one edge of the respective latter panels disposed adjacent and parallel to said first hinge lines, respectively, a pair of hinged cross partition forming panels centrally located between said inner end wall forming panels and having adjacent third hinge lines along one edge of the respective partition forming panels, locking tab formations along the remaining edges of at least said partition forming panels, hinged side wall forming panels along opposite side edges of said top forming blank having parallel fourth hinge lines normal to said first, second and third hinge lines, and hinged corner connecting flaps at opposite ends of said side wall forming panels having fifth hinge lines parallel to and approximately aligned with the adjacent first and second hinge lines, respectively, and to provide the bottom forming blank with a bottom forming panel having a locking slot extending normal to two opposite side edges of the latter panel, hinged end wall forming panels at opposite ends of said bottom forming panel having sixth hinge lines parallel to said slot, hinged side wall forming panels along said opposite edges of said bottom forming panel having parallel seventh hinge lines normal to said sixth hinge lines, and corner connecting flaps at the ends of said latter side wall forming panels having eighth hinge lines approximately parallel to and aligned with the adjacent seventh hinge lines, respectively, the combination comprising:

a frame having a series of successive forming stations spaced therealong and including a bed to slidably support said top forming blank for movement through said stations, conveyor means on said frame for feeding said top forming blank successively through said stations, means on said frame at the first station for locating said top forming blank in a position to be conveyed by said conveyor means, means on said frame at the second station for upwardly folding the inner end wall forming panels and cross partition forming panels of said top forming blank about the hinge lines thereof to erected positions wherein the latter panels are disposed substantially in planes approximately normal to said top forming blank upon movement of the latter blank to said second station, supporting means on said frame at said second station for supporting said bottom forming blank in an initial position wherein said locking slot is disposed to mate with said tab formations on said top forming blank upon movement of the latter from said second station to the third station, whereby said bottom forming blank is carried to said third station by said top forming blank, a first folding mechanism on said frame at said third station for folding the side wall forming panels and corner connecting flaps thereon of said bottom forming blank about the hinge lines thereof downwardly toward said top forming blank to positions wherein the latter side wall forming panels are disposed in planes substantially normal to said blanks, a second folding mechanism on said frame at the fourth station for folding the side wall forming panels of said top forming blank upwardly into contact with the downwardly folded side wall forming panels of said bottom forming blank, thereby to form a generally rectangular tray structure open at its ends, and thereafter folding said corner connecting flaps about their respective hinge lines inwardly across the open ends of said tray structure, folding means on said frame at the fifth station for folding the end wall forming panels of said bottom forming blank about the hinge lines thereof downwardly against the inwardly folded corner connecting flaps, a third folding mechanism on said frame at the sixth station for folding the outer end wall forming panels of said top forming blank upwardly against the downwardly folded end wall forming panels of said bottom forming blank, folding means on said frame following said third station for folding said tab formations of said top forming blank downwardly into contact with the bottom forming panel of said bottom forming blank, and means for operating said conveyor means and said folding mechanisms in timed relation.

20. A forming machine according to claim 19 including:

first glue applicator means on said frame preceding said fourth station for applying glue to the side wall forming panels of one blank, whereby the side wall forming panels of said blanks are adhesively joined at said fourth station, second glue applicator means on said frame preceding said fifth station for applying glue to the outwardly facing surfaces of the inwardly folded corner connecting flaps of said blanks, whereby said end wall forming panels of said bottom forming blank and said corner connecting flaps are adhesively joined at said fifth station, third glue applicator means on said frame preceding said sixth station for applying glue to the end wall forming panels of one blank, whereby said end wall forming panels are adhesively joined at said sixth station, and fourth glue applicator means on said frame preceding said tab formation folding means, whereby said tab formations are adhesively joined to said bottom forming panel of said bottom forming blank.

21. A method of forming a produce tray having multi-thickness side and end walls comprising the steps of:

cutting and creasing a pair of blanks to provide a top forming blank with hinged end wall forming panels each having parallel hinge lines along one edge and a locking tab formation along the opposite edge, and hinged side wall forming panels, and to provide a bottom forming blank with hinged end wall forming panels, hinged side wall forming panels and a bottom forming panel having locking slots adjacent respective ones of said end wall forming panels of said last-mentioned blank;

folding said end wall forming panels of said top forming blank about said hinge lines to erected positions approximately normal to the remainder of said top forming blank;

positioning said blanks in overlying relationship with said locking tab formations received within corresponding ones of said locking slots; and, thereafter, folding associated ones of said side wall forming panels of said top and bottom forming blanks into confronting relationship with one another;

folding said end wall forming panels of said bottom forming blank to positions approximately normal to said bottom forming panel and in overlapping relationship with associated ones of said end wall forming panels of said top forming blank; and securing said so folded end wall forming panels in such relationship.

22. A method according to claim 21, wherein said side wall forming panels are so folded into confronting relationship to position each of said side wall forming panels of said top forming blank on the outside of the associated one of said side wall forming panels of said bottom forming blank.

23. A method according to claim 21, wherein said cutting and creasing further provides cross partition forming panels hinged to said top forming blank intermediate said end wall forming panels thereof, and including the further steps of folding said cross partition forming panels to erected positions approximately parallel to one another and normal to the remainder of said top forming blank and securing said so folded cross partition forming panels to said bottom forming panel.

24. A method according to claim 21, wherein said cutting and creasing further provides at least one of said top and bottom forming blanks with corner connecting flaps integral with said side wall forming panels of the respective blank, and including the further step of folding said corner connecting flaps inwardly toward and into overlapping relationship with associated ones of so folded end wall forming panels of said top forming blank.

25. A method of forming a produce tray having multi-thickness side and end walls comprising the steps of:

cutting and creasing a pair of blanks to provide a top forming blank with hinged end wall forming panels, each having parallel hinge lines along one edge and a locking tab formation along the opposite edge, and hinged side wall forming panels, and to provide a bottom forming blank with hinged end wall forming panels, hinged side wall forming panels and a bottom forming panel having locking slots adjacent respective ones of said end wall forming panels of said last-mentioned blank, at least one of said top and bottom forming blanks being provided with corner connecting flaps integral with said side wall forming panels of the respective blank;

folding said end wall forming panels of said top forming blank to erected positions approximately normal to the remainder of said top forming blank;

positioning said blanks in overlying relationship with said locking tab formations received in interlocking engagement within corresponding ones of said locking slots;

conveying said top forming blank, carrying with it said bottom forming blank, through a plurality of forming stations; and during said conveying, folding associated ones of said side wall forming panels of said top and bottom forming blanks into face-engaging relationship with one another folding said corner connecting flaps inwardly toward and into face-engaging relationship with said so folded end wall forming panels of said top folding blank, folding said end wall forming panels of said bottom forming blank to positions approximately normal to said bottom forming panel in overlapping relationship with the associated ones of said end wall forming panels of said top forming blank, and securing said so folded end wall forming panels in such relationship.

26. A method according to claim 25, wherein said cutting and creasing further provides outer end wall forming panels hinged to said top forming blank adjacent to and outwardly of said end wall forming panels thereof, and including the further step of folding said outer end wall forming panels of said top forming blank into overlapping relationship with the associated ones of said end wall forming panels of said bottom forming blank.

27. A method of forming a produce tray having multi-thickness side and end walls comprising the steps of:

cutting and creasing a pair of rectangular and generally planar blanks of foldable material having side and end edges to provide a top forming blank with hinged end wall forming panels foldable about parallel first hinge lines extending along one edge of the respective panels substantially normal to the two opposing side edges of the top forming blank, and a locking tab formation along the edge of at least one of said end wall forming panels opposite its respective first hinge line, and hinged side wall panels foldable about parallel second hinge lines substantially normal to said first hinge lines, and to provide a bottom forming blank with a bottom forming panel, side wall forming panels hinged to the opposite side edges of said bottom forming panel about parallel third hinge lines, end wall forming panels hinged to the opposite end edges of said bottom forming panel about parallel fourth hinge lines, and at least one locking slot in said bottom forming panel adjacent one of said fourth hinge lines;

folding said end wall forming panels of said top forming blank about said first hinge lines to erected positions approximately normal to the remainder of said top forming blank;

positioning said blanks in overlying relationship with said first and fourth and said second and third hinge lines substantially parallel to one another and with said locking tab formation received in interlocking engagement within said locking slot;

conveying said top forming blank, carrying with it said bottom forming blank, through a plurality of forming stations; and during said conveying, folding associated ones of said side wall forming panels of said top and bottom forming blanks about said second and third hinge lines, respectively, toward one another and into face-engaging relationship and adhesively securing them therein and folding said end wall forming panels of said bottom forming blank about said fourth hinge lines toward said so folded end wall forming panels of said top forming blank into overlapping relationship with associated ones of the latter and adhesively securing said so folded end wall forming panels in such relationship.

28. In a machine for forming a produce tray from a pair of forming blanks which are cut and creased to provide one of said blanks with hinged panels having parallel hinge lines, and locking means on said blanks engageable to locate and interlock said blanks relative to one another when said panels of said one blank have been folded about said hinge lines to erected positions wherein the said panels are located substantially in parallel planes approximately normal to said one blank, the combination comprising:

an elongated frame including a bed to support said blanks, with said panels of said one of said blanks in said erected positions, for movement from one station to a following station spaced along said frame, supporting means on said frame at said one station for supporting said other of said blanks in an initial position wherein said locking means on said blanks engage to so locate and interlock said blanks relative to one another, whereby said blanks thereafter move as a unitary set to said following station, and conveyor means on said frame for feeding said blanks as a unitary set from said one station to said following station.

29. In a machine for forming a produce tray from a pair of mating forming blanks which are cut and creased to provide one blank with hinged side wall forming panels along two opposite side edges of the latter blank having parallel first hinge lines, and hinged corner connecting flaps at opposite ends of said side wall forming panels having parallel second hinge lines normal to said first hinge lines, and to provide the other blank with hinged side wall forming panels along two opposite side edges of the latter blank which are folded toward said one blank about third hinge lines parallel to said first hinge lines to erected positions wherein said latter side wall forming panels are disposed approximately in parallel planes substantially normal to said blanks and engage said one blank close to said first hinge lines, and hinged corner connecting flaps at opposite ends of the latter side wall forming panels having parallel fourth hinge lines normal to said third hinge lines, whereby said side wall forming panels of said one blank are foldable about said first hinge lines to erected positions wherein said side wall forming panels and corner connecting flaps of the two blanks overlap with confronting surfaces thereof in contact, thereby to form a tubular tray structure open at its ends, and said corner connecting flaps are foldable about said third and fourth hinge lines, respectively, across the open ends of said tray structure, the combination comprising:

a frame having a forming station including means to support said blanks in forming position, first folding means at said station comprising a pair of spaced parallel rails on said frame to support said blanks in said forming position with said one blank lowermost and said side wall forming panels and corner connecting flaps of the latter blank resting on said rails, and vertically movable pusher means on said frame over said rails engageable with said other blank to force the latter and said one blank between said rails, thereby to fold the latter side wall forming panels to said erected positions thereof to form said tubular tray structure, and second folding means at said station including conveyor means on said frame below said rails for receiving said blanks from between the rails and feeding said blanks from said station in a direction normal to said first and third hinge lines, means on said conveyor means for straddling said blanks in the endwise direction, thereby to fold the adjacent corner connecting flaps forwardly across the open ends of said tray structure, and means on said frame for folding the remaining corner connecting flaps rearwardly across the open ends of said tray structure as the latter emerges from said station.

References Cited by the Examiner

UNITED STATES PATENTS 3,065,679  11/1962  Clement _____ 93—51

BERNARD STICKNEY, *Primary Examiner.*